United States Patent
Yoon

(10) Patent No.: US 9,608,358 B2
(45) Date of Patent: Mar. 28, 2017

(54) ELECTRONIC DEVICE INCLUDING OPENING

(71) Applicant: Samsung Electronics Co., Ltd., Gyeonggi-do (KR)

(72) Inventor: Byoung-Uk Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 2 days.

(21) Appl. No.: 14/619,184

(22) Filed: Feb. 11, 2015

(65) Prior Publication Data

US 2015/0230348 A1    Aug. 13, 2015

(30) Foreign Application Priority Data

Feb. 13, 2014  (KR) .................. 10-2014-0016552

(51) Int. Cl.
| | |
|---|---|
| *H05K 7/14* | (2006.01) |
| *H05K 7/18* | (2006.01) |
| *H01R 13/52* | (2006.01) |
| *H01R 24/58* | (2011.01) |
| *H01R 43/00* | (2006.01) |
| *H04M 1/02* | (2006.01) |

(52) U.S. Cl.
CPC ......... *H01R 13/5202* (2013.01); *H01R 24/58* (2013.01); *H01R 43/005* (2013.01); *H04M 1/0274* (2013.01)

(58) Field of Classification Search
USPC ....... 361/728–730, 752, 796, 790, 807, 809, 361/810; 439/118, 668, 669, 751
See application file for complete search history.

(56) References Cited

U.S. PATENT DOCUMENTS

| | | | | |
|---|---|---|---|---|
| 5,961,350 A | * | 10/1999 | Shiu ................... | H01R 12/7017 439/108 |
| 7,901,221 B1 | | 3/2011 | Li et al. | |
| 8,011,976 B2 | * | 9/2011 | Ooki ..................... | H01R 13/50 439/736 |
| 8,335,087 B2 | * | 12/2012 | Xie ........................ | H01R 23/70 361/799 |
| 8,629,355 B2 | * | 1/2014 | Kwon ................... | H04B 15/04 174/354 |
| 8,891,006 B2 | * | 11/2014 | Afshari ................ | H04N 5/2257 348/340 |
| 2006/0089054 A1 | | 4/2006 | Woo | |
| 2009/0167631 A1 | * | 7/2009 | Tai ........................... | H01Q 1/22 343/906 |
| 2009/0209118 A1 | | 8/2009 | Wahlberg et al. | |

(Continued)

FOREIGN PATENT DOCUMENTS

| | | |
|---|---|---|
| CN | 202678570 U | 1/2013 |
| CN | 202737215 U | 2/2013 |

(Continued)

*Primary Examiner* — Hung S Bui
(74) *Attorney, Agent, or Firm* — Cha & Reiter, LLC

(57) ABSTRACT

An electronic device may include a housing that may include an opening formed on an outer surface and a space fluidly communicating with the opening, at least one electronic element which is disposed in the space, and at least one terminal which is disposed on the outer surface of the housing and is electrically connected with the at least one electronic element.

19 Claims, 31 Drawing Sheets

(56) References Cited

U.S. PATENT DOCUMENTS

2009/0244879 A1    10/2009   Wang
2011/0195611 A1    8/2011   Little et al.
2013/0065445 A1    3/2013   Nagata et al.

FOREIGN PATENT DOCUMENTS

| | | |
|---|---|---|
| EP | 2 571 106 A1 | 3/2013 |
| JP | 6-241282 A | 8/1994 |
| JP | 7-217536 A | 8/1995 |
| JP | 2004-129167 A | 4/2004 |
| JP | 2009-87709 A | 4/2009 |
| JP | 2010-219025 A | 9/2010 |
| JP | 2012-89390 A | 5/2012 |
| KR | 10-2005-0053456 A | 6/2005 |
| KR | 10-2006-0073234 A | 6/2006 |
| KR | 10-2006-0086633 A | 8/2006 |
| KR | 10-2006-0100559 A | 9/2006 |
| WO | 2010/104353 A1 | 9/2010 |

* cited by examiner

ELECTRONIC DEVICE INCLUDING OPENING

CLAIM OF PRIORITY

The present application claims priority under 35 U.S.C. §119 to an application filed in the Korean Intellectual Property Office on Feb. 13, 2014 and assigned Serial No. 10-2014-0016552, the entire contents of which are hereby incorporated herein by reference.

BACKGROUND

1. Technical Field

The present disclosure generally relates to an electronic device with a waterproof function.

2. Description of the Related Art

At present, with the growth of electronic communication industry, user devices (for example, electronic devices such as smartphones, cellular phones, electronic schedulers, personal convergence terminals, laptop computers, and the like) have become necessities in modern society and have become an important means for relaying information. Nowadays, user devices provide a Graphical User Interface (GUI) environment using a touch screen and can provide various multimedia based on a web environment.

In addition, user devices may include an opening or port for diverse purposes and/or to provide various functions such that a plug of an external device may be connected to the socket of the user device and thus the external device may be electrically connected with the user device. For example, user devices may include a socket (for example, an earphone jack).

SUMMARY

In accordance with an aspect of the present disclosure an electronic device may inhibit or prevent a foreign substance (e.g., water) from entering through an opening (e.g., an opening of a socket (e.g., for the reception of an earphone plug).

In accordance with another aspect of the present disclosure an electronic device may have opening-related parts simplified, a manufacturing cost reduced, and a limitation to an exterior design improved.

In accordance with a further aspect of the present disclosure, an electronic device may include a housing which may include an opening formed on an outer surface and a space fluidly communicating with the opening; at least one electronic element which is disposed in the space; and/or at least one terminal which is disposed outside the housing and is electrically connected with the at least one electronic element.

In accordance with another embodiment of the present disclosure, the electronic device can prevent malfunction or damage of the electronic device by preventing or inhibiting a foreign substance (for example, water, dust, and the like) from entering the electronic device through a socket. In addition, the socket may be mounted in a housing (or a case frame) of the electronic device and may be electrically connected with a main board in an electric contact method. Therefore, a limitation on an exterior design can be improved and also an assembling process can be improved.

These and other aspects, advantages and salient features of the disclosure will become better understood by those skilled in the art from the following detained description, which, taken in conjunction with the annexed drawings, discloses embodiments of the disclosure.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
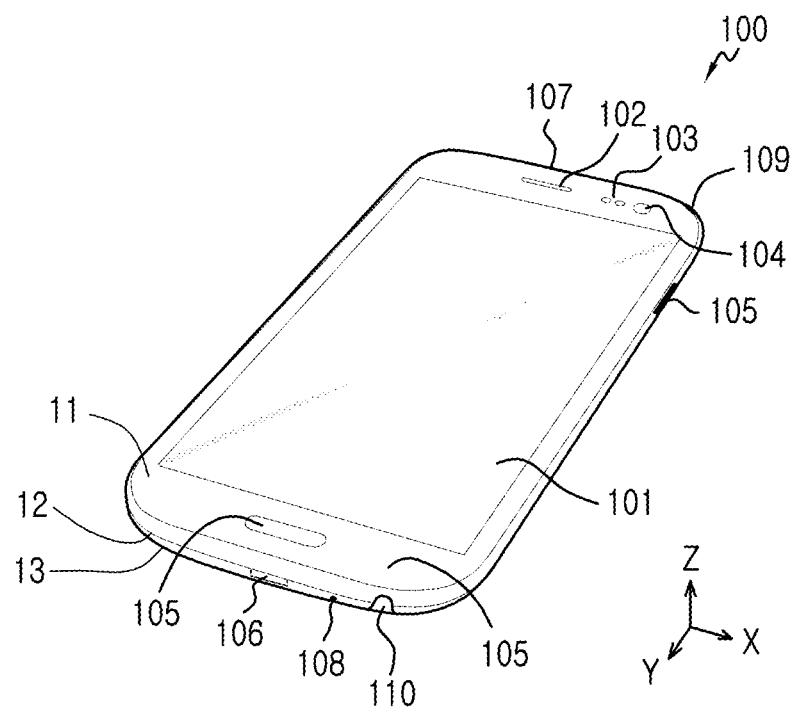
FIG. 1 is a perspective view of an electronic device according to an embodiment of the present disclosure.

Embodiments of the present disclosure will be described hereinbelow with reference to the accompanying drawings. Although specific embodiments of the present disclosure are illustrated in the drawings and relevant detailed descriptions are provided, various changes can be made and various embodiments may be provided. Accordingly, various embodiments of the present disclosure are not limited to the specific embodiments and should be construed as including all changes, equivalents or substitutes included in the ideas and technological scopes of embodiments of the present disclosure. In the explanation of the drawings, similar reference numerals are used for similar elements.

The terms "include" or "may include" used in the embodiments of the present disclosure indicate the presence of disclosed corresponding functions, operations, elements, and the like, and do not limit additional one or more functions, operations, elements, and the like. In addition, it should be understood that the terms "include" or "have" used in the embodiments of the present disclosure are to indicate the presence of features, numbers, tasks, operations, elements, parts, or a combination thereof described in the specifications, and do not preclude the presence or addition of one or more other features, numbers, steps, operations, elements, parts, or a combination thereof.

The term "or" used in the embodiments of the present disclosure includes any and all combinations of words enumerated with it. For example, "A or B" means including A, including B, or including both A and B.

Although the ordinal terms such as "first" and "second" used in the various embodiments of the present disclosure may modify various elements of the various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of the various embodiments of the present invention, and similarly, a second element may be named a first element.

It will be understood that when an element is mentioned as being "connected" or "coupled" to another element, the element may be directly connected or coupled to another element, and there may be an intervening element between the element and another element. To the contrary, it will be understood that when an element is described as being "directly connected" or "directly coupled" to another element, there is no intervening element between the element and another element.

The terms used in the various embodiments of the present disclosure are for the purpose of describing particular embodiments only and are not intended to limit the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments.

An electronic device according to various embodiments of the present disclosure may be a device that is equipped with a communication function. For example, the electronic device may include at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), an MP3 player, a mobile medical machine, a camera, or a wearable device (e.g., a head-mounted-device (HMD) such as electronic glasses, electronic clothing, an electronic bracelet, an electronic necklace, an electronic appcessory (i.e., a smartphone accessory that is combined with a specially written elements), electronic tattoos, or a smartwatch).

According to an embodiment, the electronic device may be a smart home appliance that is equipped with a communication function. For example, the smart home appliance may include at least one of a television, a Digital Video Disk (DVD) player, a stereo, a refrigerator, an air conditioner, a cleaner, an oven, a microwave oven, a washing machine, an air cleaner, a set-top box, a TV box (for example, Samsung HomeSync™, Apple TV™, or Goggle TV™), a game console, an electronic dictionary, an electronic key, a camcorder, or an electronic album.

According to an embodiment, the electronic device may include at least one of various medical machines (for example, Magnetic Resonance Angiography (MRA), Magnetic Resonance Imaging (MRI), Computerized Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (for example, a navigation equipment for ship, a gyro compass, and the like), avionics, a security device, or an industrial or home robot.

According to an embodiment, the electronic device may include at least one of a part of furniture or a building/a structure including a communication function, an electronic board, an electronic signature receiving device, a projector, and various measurement devices (for example, water, power, gas, radio waves, and the like). The electronic device according to various embodiments of the present disclosure may be one or a combination of one or more of the above-mentioned devices. In addition, it is obvious to an ordinary skilled person in the related art that the electronic device according to various embodiments of the present disclosure is not limited to the above-mentioned devices.

Hereinafter, an electronic device according to various embodiments will be explained with reference to the accompanying drawings. The term "user" used in the various embodiments may refer to a person who uses the electronic device or a device that uses the electronic device (for example, an artificial intelligence electronic device).

FIG. 1 is a perspective view of an electronic device according to an embodiment of the present disclosure.

Referring now to FIG. 1, the electronic device 100 may include a touch screen 101, a speaker 102, at least one sensor 103, a camera 104, at least one key 105, at least one socket 106, 107, a microphone 108, an antenna 109, or a stylus 110, etc. The electronic device 100 may include a front surface 11, a side surface 12, and a rear surface 13. The front surface 11 and the rear surface 13 may be opposite each other, and the side surface 12 may connect the front surface 11 and the rear surface 13.

The touch screen 101 may display an image and receive a touch input. The touch screen 101 may be disposed on the front surface 11 of the electronic device 100.

The speaker 102 may output electric signals as a sound. The speaker 102 may be disposed on the front surface 11 of the electronic device 100. Alternatively, the speaker 102 may be disposed on the side surface 12 or the rear surface 13 of the electronic device 100 although not shown in the drawings.

The at least one sensor 103 may measure a physical quantity or detect an operation state of the electronic device 100, and may convert measured or detected information into electric signals. The at least one sensor 103 may include at least one of a gesture sensor, a proximity sensor, a grip sensor, a gyro sensor, an acceleration sensor, a geomagnetic sensor, a barometric sensor, a temperature/humidity sensor, a hall sensor, a red, green, blue (RGB) sensor, an illuminance sensor, a biosensor, a Ultra Violet (UV) sensor, or a stylus detector.

The camera 104 may photograph an image and a moving image. The camera 104 may be disposed on the front surface 11 of the electronic device 100. Alternatively, the camera 104 may be disposed on the side surface 12 or the rear surface 13 of the electronic device 100 although not shown in the drawings.

The at least one key 105 may include a press-type or a touch-type key.

The at least one socket 106, 107 (an earphone jack, a charging jack, a communication jack, and the like) may be an interface device for electrically connecting with an external device (for example, a headset or pair of earphones, a charging device, and the like). The at least one socket 106, 107 may include a configuration to connect a plug such as a High Definition Multimedia Interface (HDMI), a Universal Serial Bus (USB), a projector, a D-subminiature (D-sub), and the like. The at least one socket 106, 107 may be disposed on the side surface 12 of the electronic device 100. Alternatively, the at least one socket 106, 107 may be disposed on the front surface 11 or the rear surface 13 of the electronic device 100 although not shown in the drawings.

Even when a foreign substance enters the sockets 106 and 107, these sockets 106 107 are configured to inhibit or prevent a foreign substance that may enter the socket from moving farther into the electronic device 100 according to the teachings of the present disclosure. A more detailed description of the one socket 106, 107 will be explained with reference to FIGS. 2 to 31.

The microphone 108 may convert a sound into electric signals. The microphone 108 may be disposed on the side surface 12 of the electronic device 100. Alternatively, the microphone 108 may be disposed on the front surface 11 or the rear surface 13 of the electronic device 100 although not shown in the drawings.

The antenna 109 (for example, a Digital Multimedia Broadcasting (DMB) antenna) may transmit and receive radio waves. The antenna 109 may be drawn out through an opening formed on the side surface 12 of the electronic device 100 and extended.

The stylus 110 may be an input device for making a digitizer panel (not shown) of the touch screen 100 respond thereto. For example, the stylus 110 may operate in an electromagnetic induction method. The stylus 110 may be removed from the electronic device 100 through an opening formed on the side surface 12 of the electronic device 100.

Figure 2:
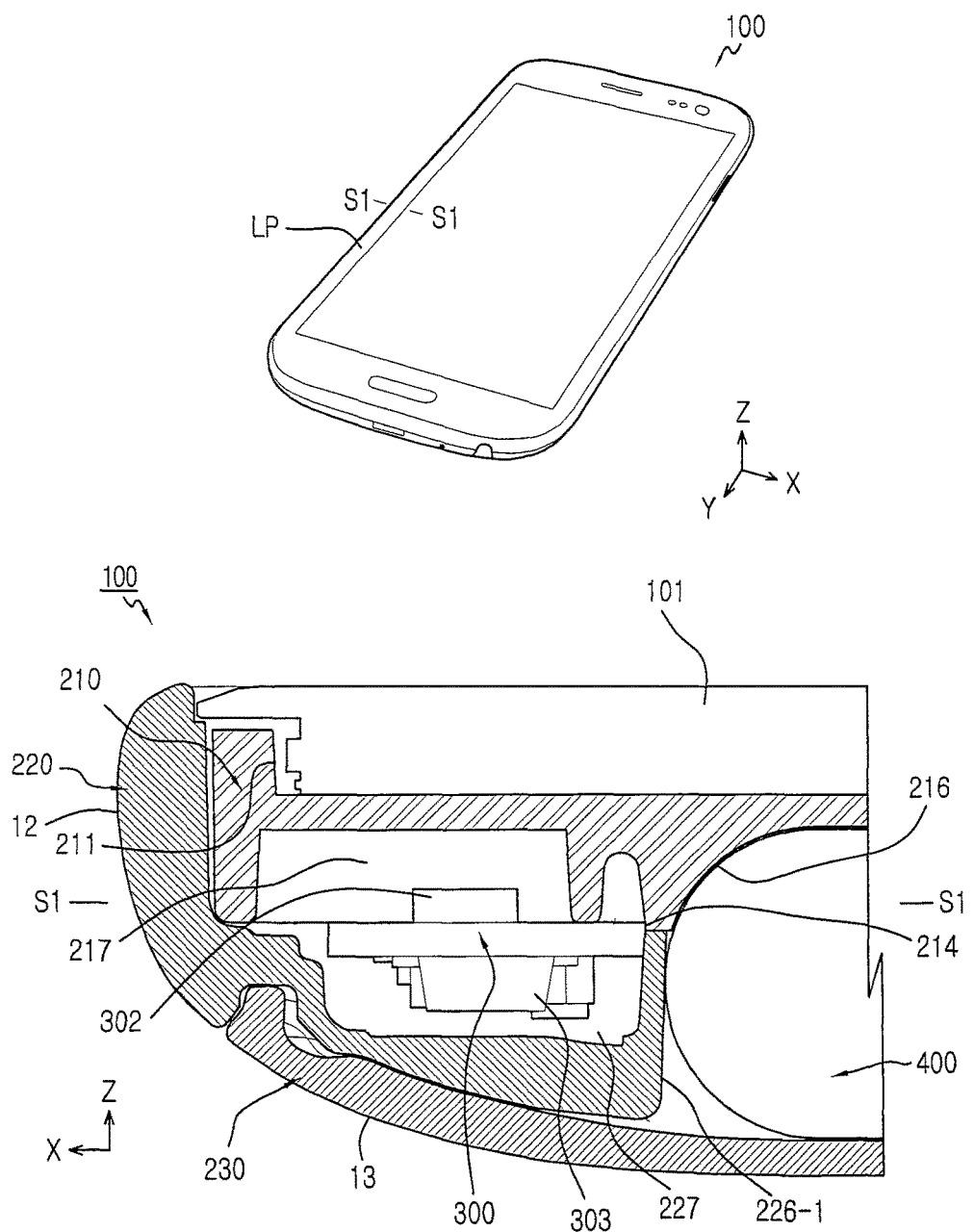
FIG. 2 is a cross-sectional view of the electronic device of FIG. 1 taken along sectional line S1-S1.

FIG. 2 is a cross-sectional view of the electronic device 100 taken along section line S1-S1, which may include a left edge LP of the electronic device 100.

Referring now to FIG. 2, the electronic device 100 may include a touch screen 101, a bracket 210, a device case (rear case) 220, a battery cover 230, a main circuit board (a main board, a mother board, and/or a Printed Circuit Board (PCB)) 300, or a battery 400.

The touch screen 101 may include a window, a touch panel, a display panel, and/or a digitizer panel (not shown).

The bracket 210 may be a mounting plate on which a plurality of electronic parts may be installed. The bracket 210 may be a frame for fixing and supporting the plurality of electronic parts. The bracket 210 may include a first surface formed on an upper portion thereof and a second surface formed on a lower portion thereof. The first surface and the second surface of the bracket 210 may be a mounting surface on which the electronic parts may be mounted. The first surface and/or the second surface of the bracket 210 may include surfaces of various shapes such as a flat surface, a curved surface, a slanted surface, and the like. The bracket 210 may have the touch screen 201 seated therein. The bracket 210 may have the main circuit board 300 seated therein. The bracket 210 may have electronic parts including the PCB seated therein. The bracket 210 may have electronic parts connected with the main circuit board 300 via an electrical connecting means (for example, a cable, a Flexible Printed Circuit Board (FPCB), or the like) seated therein. The bracket 210 may include a plurality of recesses to have a plurality of parts seated therein. For example, the bracket 210 may include a recess 211 to have the touch screen 201 seated therein. The bracket 210 may include a recess 214 to have the main circuit board 300 seated therein. The bracket 210 may include a recess 217 to house electronic parts 302 protruding from the main circuit board 300 upwardly. The bracket 210 may include a battery pack housing recess 216 of a vessel shape, which may be formed on the lower portion and inwardly curves to house a part of a battery pack 400.

The device case 220 may be connected with the bracket 210 (for example, by snap-fit fastening or bolt fastening). Alternatively, according to an embodiment, the device case 220 may not exist as a separate piece from the battery cover 230 and may be integrally formed with the battery cover 230. The device case 220 may cover the plurality of parts fixed to the bracket 210. The device case 220 may cover at least part of the main circuit board 300 fixed to the bracket 210. The bracket 210, the device case 220, and the main circuit board 300 may be connected with one another, for example, by bolt fastening. The device case 220 may include a recess 227 to house electronic parts 303 protruding from the main circuit board 300 downwardly. The device case 220 may include a battery pack placement part 226-1 to allow the battery pack 400 to pass therethrough. As shown in FIG. 2, the battery pack placement part 226-1 may be an opening which penetrates between an upper portion and a lower portion of the case device 220, and may fluidly communicate with the battery pack housing recess 216 of the vessel shape of the bracket 210. When the bracket 210 is connected with the device case 220, the battery pack housing recess 216 of the bracket 210 and the battery pack placement part 226-1 of the device case 220 may provide a space of a vessel shape to house the entirety of the battery pack 400. The battery pack placement part 226-1 of the device case 220 may be formed in a vessel shape to house the entirety of the battery pack 400, and the battery pack housing recess 216 of the bracket 210 may not be required. In addition, the battery pack housing recess 216 may be formed in a vessel shape to house the entirety of the battery pack 400 and the battery pack placement part 226-1 of the device case 220 may not be required.

The battery cover 230 may be removable from the device case 220, and may include a plurality of hooks (not shown) formed along an edge to be inserted into a plurality of hook fastening recesses of the device case 220.

When the bracket 210, the device case 220, and the battery cover 230 are connected to one another, an exposed surface of at least part of them may form an outer surface of the electronic device 100. For example, the device case 220 may form the side surface 12 of the electronic device 100. In addition, the battery cover 230 may form the rear surface 13 of the electronic device 100.

The main circuit board 300 may be a board on which a basic circuit and a plurality of electronic parts may be mounted. The main circuit board 300 may set an execution environment of the electronic device 100, maintains information of the electronic device 100, and stably drives the electronic device 100. In addition, the main circuit board 300 may facilitate data input and output and data exchange of all devices of the electronic device 100.

The main circuit board 300 may be disposed between the bracket 210 and the device case 220. The main circuit board 300 may be connected with the bracket 220 by using a fastening means such as a bolt.

Figure 3:
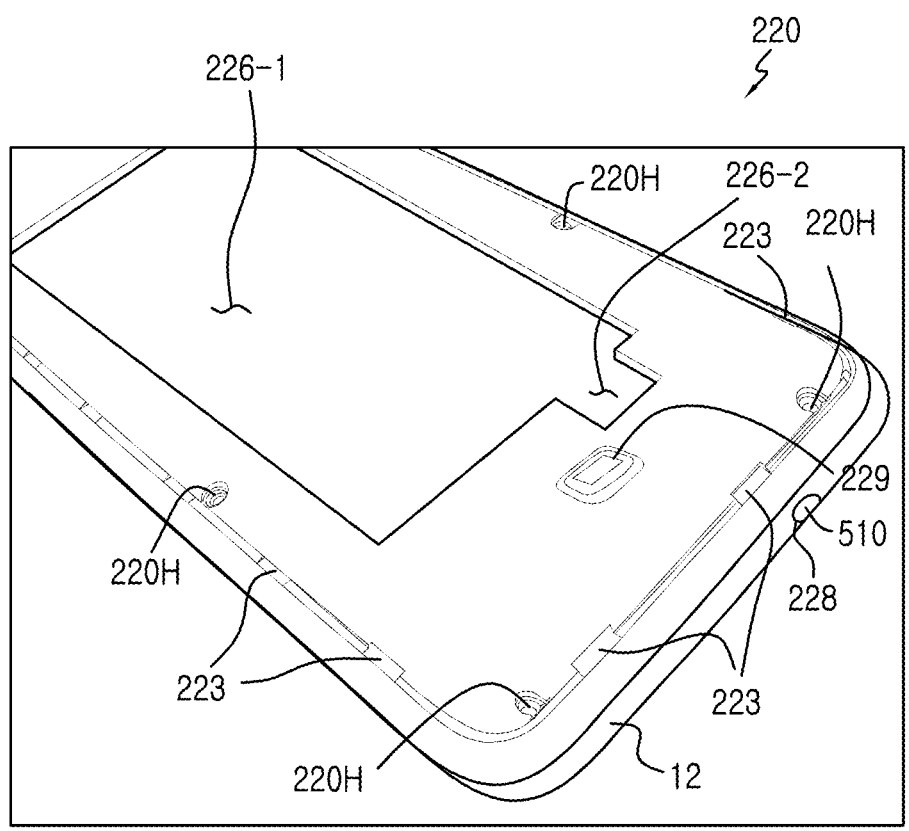
FIG. 3 is a perspective view of a device case according to an embodiment of the present disclosure.

FIG. 3 is a perspective view of a device case according to an embodiment of the present disclosure.

Referring now to FIG. 3, the device case 220 may include a plurality of hook locking recesses 223, a battery pack placement part 226-1, a memory socket placement part 226-2, a plug insertion passage 510, and a camera window 229. At least part of the device case 220 may include a metal or nonmetal material.

The plurality of hook locking recesses 223 may be formed inside the edge and may be connected with the plurality of hooks (not shown) of the battery cover 230.

The battery pack placement part 226-1 may form a space for mounting the battery pack 400 along with the battery pack housing recess 216 of the bracket 210.

The memory socket placement part 226-2 may have memory sockets (not shown) of the main circuit board 300 exposed.

The plug insertion passage 510 may be a part into which a plug of an external device (for example, a headset or earphones) (not shown) may be inserted. The plug insertion passage 510 may include an opening 228 through which the plug of the external device may be in and out. The opening 228 may be formed on a side edge 12 of the device case 220 (for example, the side surface 12 of the electronic device 100 of FIG. 1 or 2).

The camera window 229 may be positioned in a corresponding location to a camera (not shown) mounted on the main circuit board 300, and may be transparent to be able to allow light to enter the camera. Although not shown, the device case 220 may include a flash window which may be disposed to correspond to a flash mounted on the main circuit board 300 and may be transparent to be able to allow light of the flash to pass therethough.

The device case 220 may include bolt fastening holes 220H. A plurality of bolts (not shown) may penetrate through the bolt fastening holes 220H of the device case 220 and may be fastened to the bracket 210.

Figure 4:
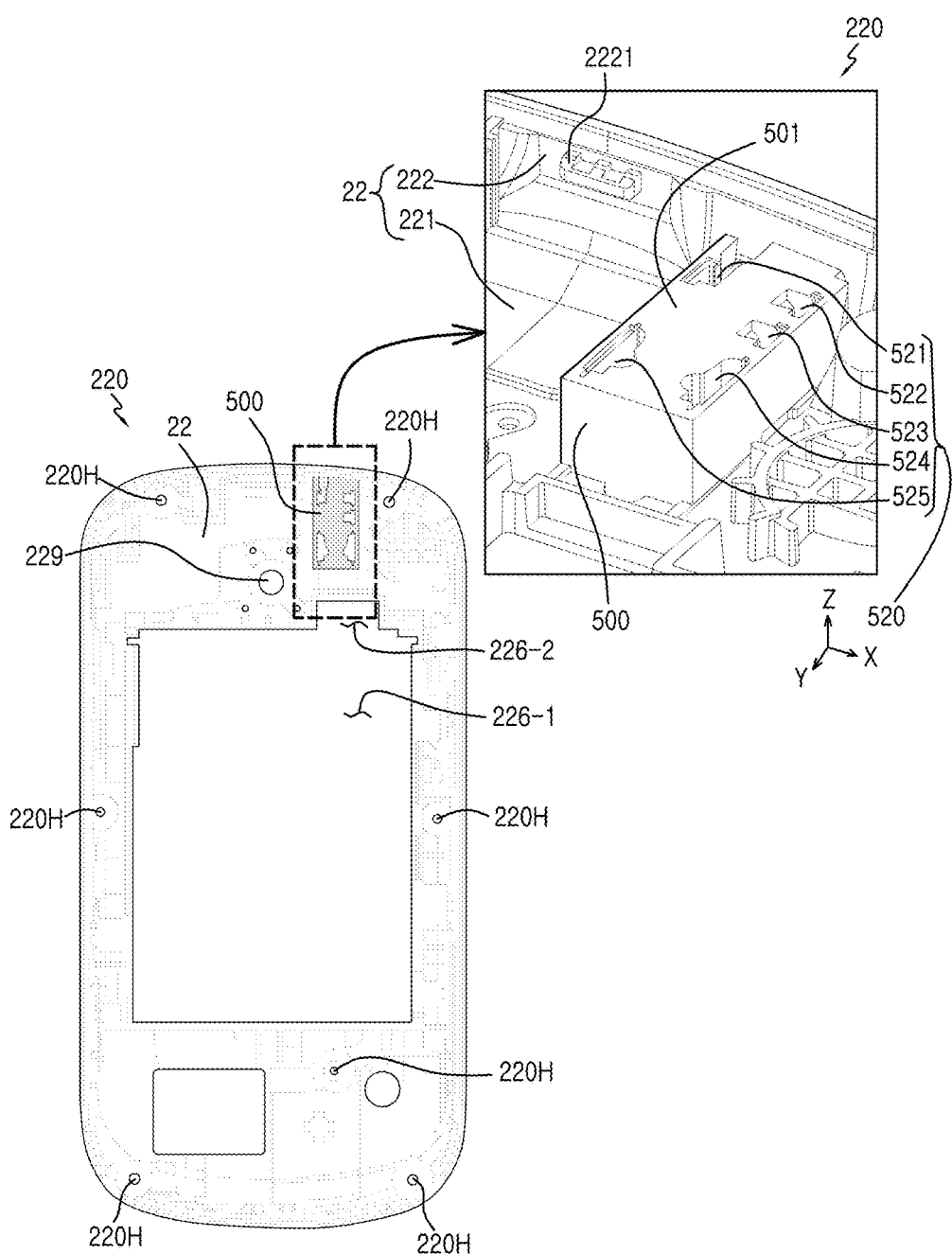
FIG. 4 is a back view of a device case according to an embodiment of the present disclosure.

FIG. 4 is a back view of a device case according to an embodiment of the present disclosure.

Referring now to FIG. 4, the device case 220 may include a lower part 22 to house the main circuit board 300 and the bracket 210. The lower part 22 may include a bottom surface 221 and a side surface 222. The bottom surface 221 or the side surface 222 may include a protrusion form or a recess form to connect with the bracket 210, the main circuit board 300, or other elements. For example, the side surface 222 may include a hook 2221 to be used for snap-fit fastening with the bracket 210.

In addition, the device case 220 may include the battery pack placement part 226-1, the memory socket placement part 226-2, the bolt fastening holes 220H, or the camera window 229 as described above. The camera window 229 may be attached to the bottom surface of the lower part 22 by using a predetermined bonding method (for example, seam welding).

In addition, the device case 220 may include a socket body 500. The socket body 500 may protrude and extend from the bottom surface 221 of the lower part 22 in a vertical direction (for example, a Z-axis direction), and may be connected with the side surface 222 of the lower part 22. For example, the socket body 500 may be formed in a substantially polyhedral shape as shown in FIG. 4. Alternatively, the socket body 500 may be formed in a curved figure shape although not shown. At least part of the socket body 500 may include a metal or nonmetal material.

The socket body 500 may be integrally formed with the device case 220 when the device case 220 may be formed (for example, by an injection molding process). Alternatively, the socket body 500 may be formed of a different material from that of the lower part 22. Alternatively, the socket body 500 may be separately manufactured and may be attached to the lower part 22 of the device case 220 by using a predetermined attaching method. For example, the socket body 500 may be formed by various injection molding processes (for example, dual injection molding, insert injection molding, and the like). In addition, the socket body 500 may be bonded to the device case 220 by bonding, fusing, depositing, welding, and the like. The outer surface of the socket body 500 and the outer surface of the device case 220 may be evenly connected with each other, for example, without forming a parting line.

The socket body 500 may include a plug insertion passage 510 (see FIG. 3) and/or a terminal installation part 520 (or an installation space). The terminal installation part may 520 include a space which may be opened to an upper part 501 of the socket body 500. The terminal installation part 520 may fluidly communicate with the plug insertion passage 510. The upper part 501 of the socket body 500 may include a flat surface.

A plurality of terminal members (not shown) may be disposed in the terminal installation part 520 of the socket body 500, and some of the plurality of terminal members may be disposed in the plug insertion passage 510. The plurality of terminal members may be disposed in a mold, and the socket body 500 may be formed (for example, an insert injection molding process), the above-described terminal installation part 520 may not be required.

Figure 5:
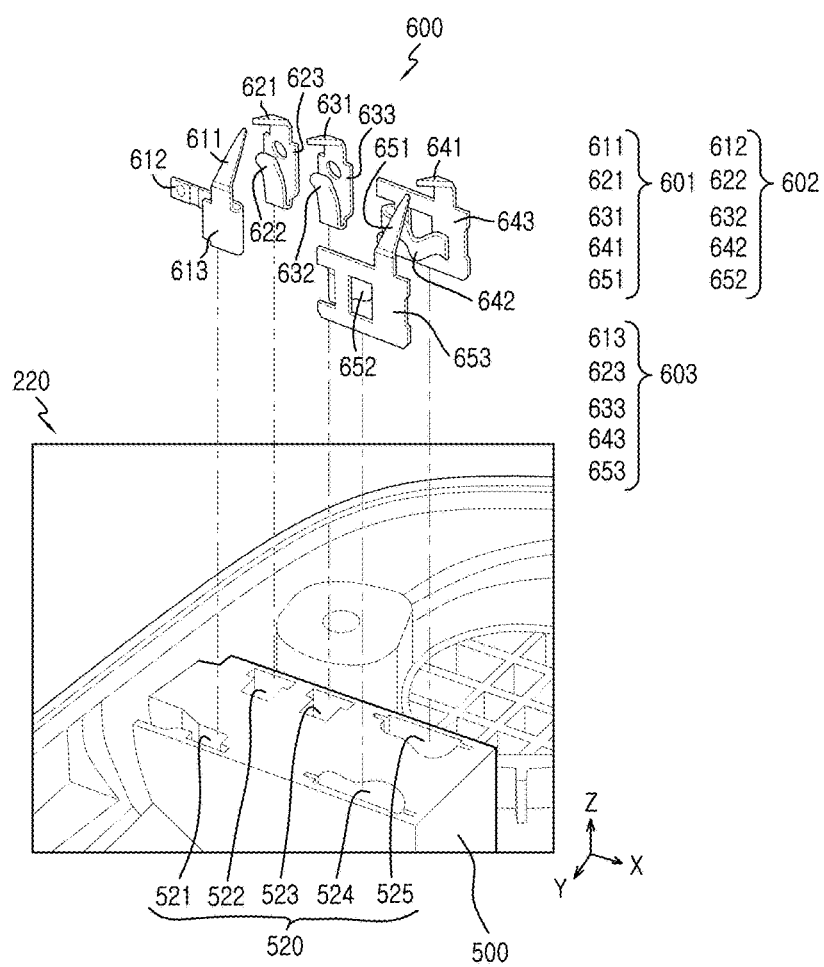
FIG. 5 is an enlarged perspective view of the indicated area of FIG. 4 showing a plurality of terminal elements and a device case including a socket in a disassembly state.

FIG. 5 illustrates a plurality of terminal members and a device case in a disassembly state according to an embodiment of the present disclosure.

Referring now to FIG. 5, a plurality of terminal members 600 may include a first terminal part 601, a second terminal part 602, and a connection part 603. The majority of the first terminal part 601, the second terminal part 602, and the connection part 603 may be integrally formed with one another. The first terminal part 601 may be an element, which can electrically contact the main circuit board 300 (not shown) (FIG. 2). The second terminal part 602 may be an element, which can electrically contact a plug of an external device (not shown) (for example, a headset or a pair of earphones). The first terminal part 601 or the second terminal part 602 may include an elastic terminal. The connection part 603 may be an element, which electrically connects the first terminal part 601 and the second terminal part 602.

For example, the plurality of terminal members 600 may be a bent metal plate, which may be formed by bending a metal plate. The first terminal part 601 may be bent by a predetermined angle with respect to the connection part 603. In addition, the first terminal part 601 may be formed in a shape gradually becoming narrower toward its end. In addition, the first terminal part 601 may include an additional protrusion (not shown) to electrically contact. For example, the first terminal part 601 may include a protrusion protruding in a hemispherical shape or a cylindrical shape, and this protrusion may electrically contact the main circuit board 300 (for example, point-contact, surface-contact, or the like).

Figure 6:
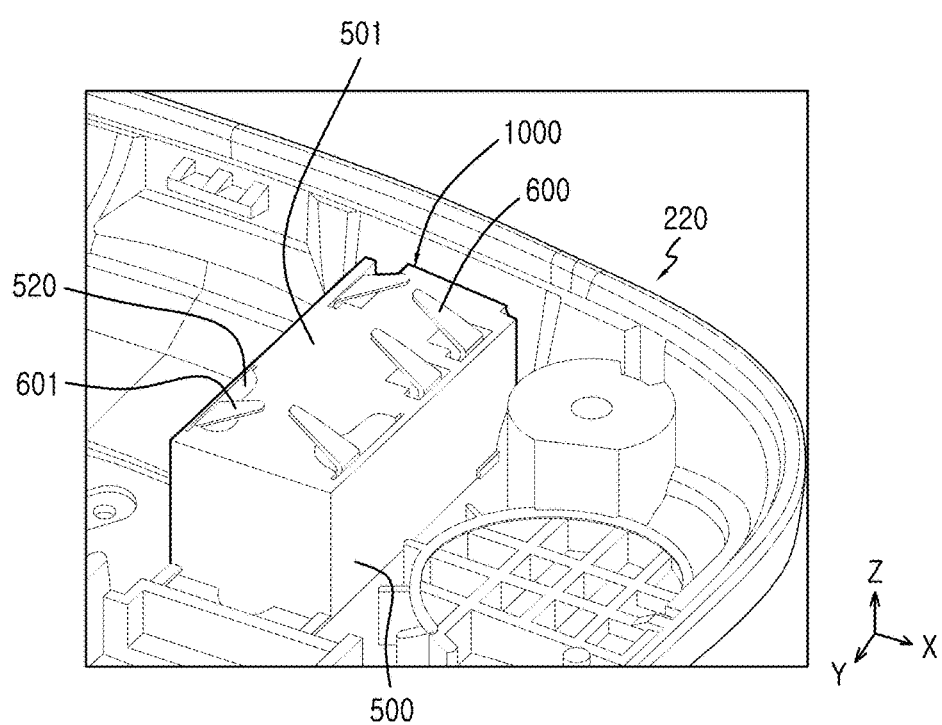
FIG. 6 is an enlarged perspective view of the indicated area of FIG. 4 in which the socket includes terminal members according to an embodiment of the present disclosure.

FIG. 6 is an enlarged perspective view of the indicated area of FIG. 4 in which the socket includes terminal members according to an embodiment of the present disclosure.

Referring now to FIG. 6, a socket 1000 may be formed to have the plurality of terminal members 600 inserted into the terminal installation part 520 of the socket body 500 of the device case 220. Alternatively, the plurality of terminal members 600 may be disposed in a mold and then the socket body 500 may be formed (for example, an insert injection molding process). In this case, the terminal installation part 520 may not be required.

The first terminal part 601 of the plurality of terminal members 600 may protrude out of the upper part 501 of the socket body 500. Some parts of the second terminal part 602 of the plurality of terminal members 600 may be disposed in the plug insertion passage 510 (not shown) (FIG. 3) of the socket body 500. The connection part 603 (FIG. 5) of the plurality of terminal members 600 may be housed and fixed in the terminal installation part 520 of the socket body 500.

When the device case 220 and the main circuit board 300 (FIG. 2) may be connected with each other, the first terminal part 601 of the plurality of terminal members 600 may press the main circuit board 300 and may have its shape elastically deformed (for example, by bending).

When a plug of an external device (for example, a headset or earphones) may be inserted into the plug insertion passage 510 of the socket body 500, the second terminal part 602 of the plurality of terminal members 600 may press the plug of the external device and may have its shape elastically deformed (for example, bending).

Figure 7:
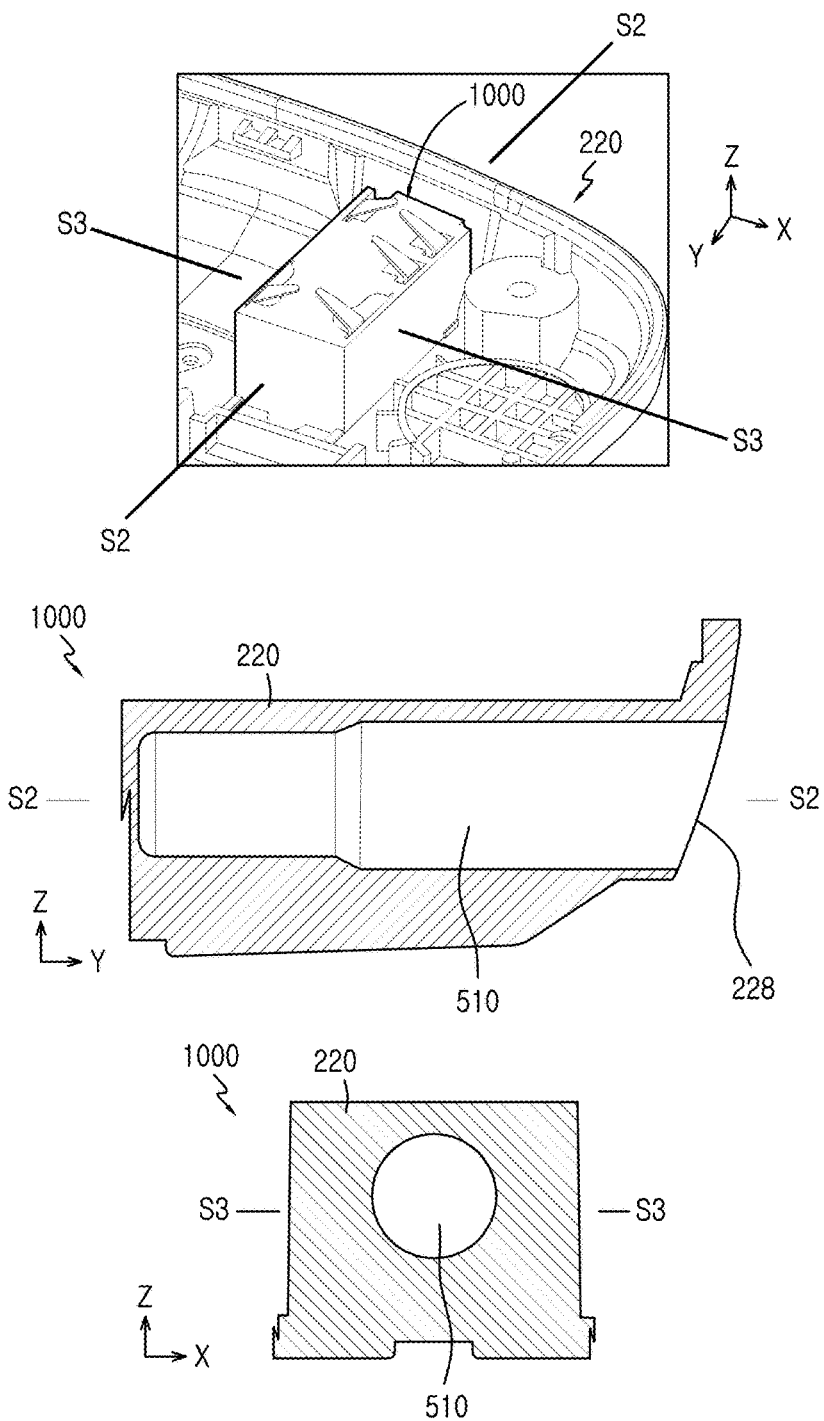
FIG. 7 are cross-sectional views of the socket of the device case and socket of FIG. 4 taken along sectional lines S3-S3 and S4-S4.

FIG. 7 are cross-sectional views of the socket of the device case and socket of FIG. 4 taken along sectional lines S3-S3 and S4-S4.

Referring now to FIG. 7, the socket 1000 may include the plug insertion passage 510 including a space which may be opened to the outside of the device case 220. A plug of an external device (not shown) (for example, an earset) may be connected with the socket 1000 by being inserted into the plug insertion passage 510 through the opening 228.

Figure 8:
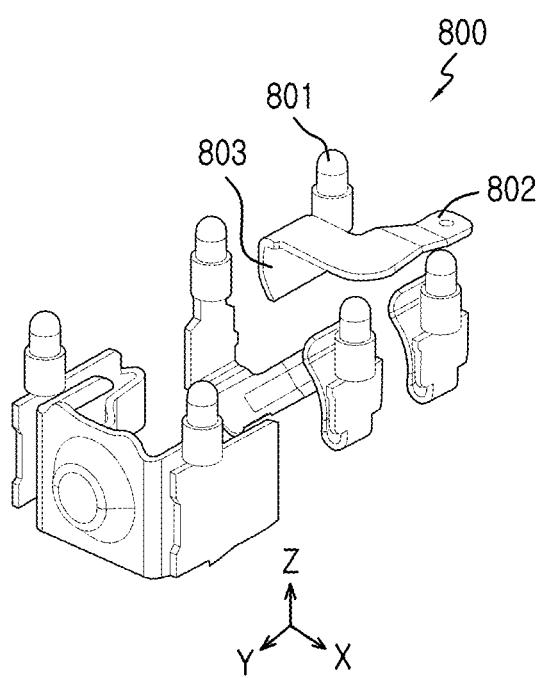
FIG. 8 is a perspective view of a plurality of terminal members according to an embodiment of the present disclosure.

FIG. 8 illustrates a plurality of terminal members according to an embodiment of the present disclosure.

Referring to FIG. 8, the plurality of terminal members 800 may include a first terminal part 801, a second terminal part 802, and a connection part 803. The first terminal part 801 may be a pogo pin having elasticity and may correspond to the first terminal part 601 of FIG. 5. The second terminal part 802 and the connection part 803 may be formed by bending a metal plate and may correspond to the second terminal part 602 and the connection part 603 of FIG. 5. The first terminal part 801 may be fixed to the connection part 803 by welding (for example, soldering).

Figure 9:
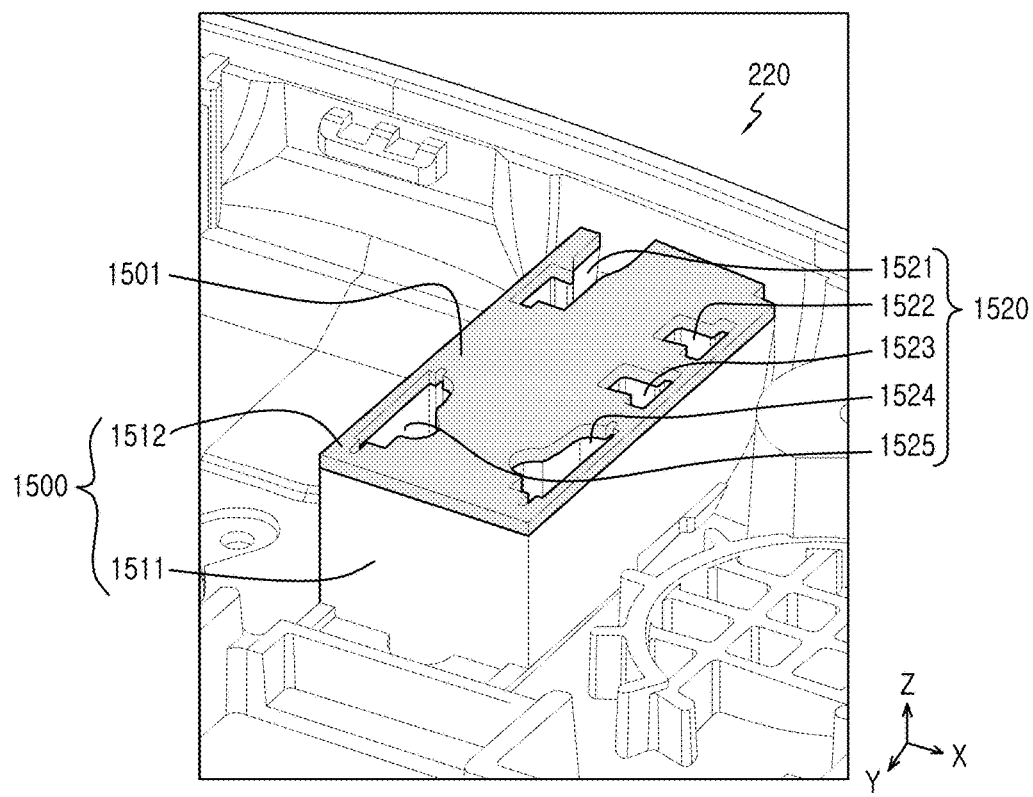
FIG. 9 is a perspective view of a device case including a socket according to an embodiment of the present disclosure.

FIG. 9 is a perspective view of a device case including a socket according to an embodiment of the present disclosure.

Referring now to FIG. 9, the device case 220 may include a socket body 1500. The socket body 1500 (for example, the socket body 500) may include a plug insertion passage 1510 and a terminal installation part 1520. The plug insertion passage 1510 (for example, the plug insertion passage 510) may be a part into which a plug of an external device (not shown) (for example, a headphone or earphones) may be inserted. The terminal installation part 1520 (for example, the terminal installation part 510) may include a space, which may be opened to an upper part 1501 of the socket body 1500. The terminal installation part 1520 may fluidly communicate with the plug insertion passage 1510.

The exterior of the socket body 1500 may be formed by connecting a plurality of parts. For example, the socket body 1500 may be formed by connecting a first body 1511 and a second body 1512.

Figure 10:
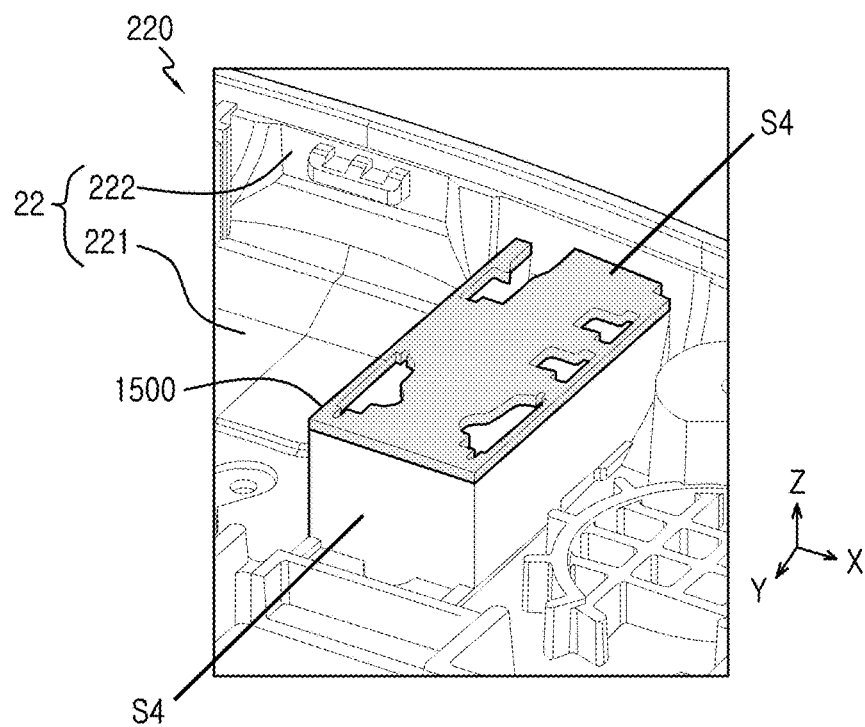
FIG. 10 is a cross-sectional view of the device case and socket of FIG. 9 taken along sectional line S4-S4.
Figure 10:
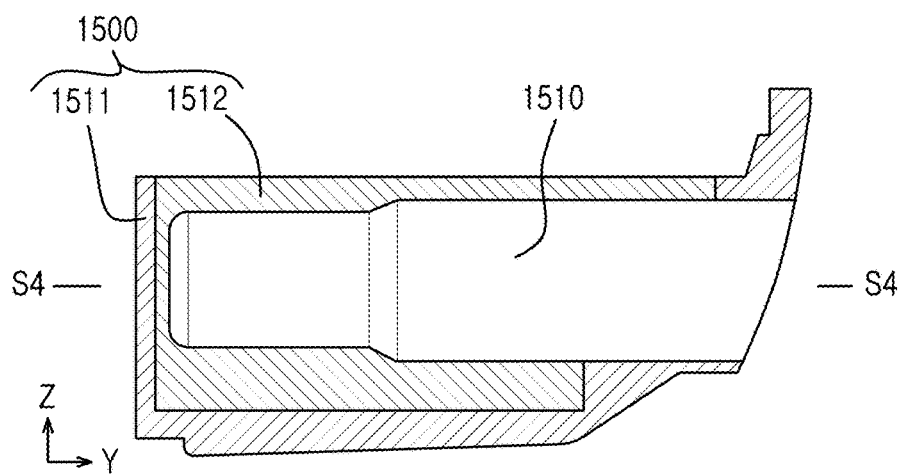

FIG. 10 is a cross-sectional view of the device case and socket of FIG. 9 taken along sectional line S4-S4.

Referring now to FIG. 10, the socket body 1500 may include the first body 1511 and the second body 1512. The first body 1511 may include a protrusion form and/or a recess form formed on the bottom surface 221 and the side surface 222 of the lower part 22 of the device case 220. The second body 1512 may be combined with the first body 1511. The second body 1512 may be made of the same material as that of the first body 1511 or a different material. For example, the second body 1512 may be a metal or nonmetal material.

For example, the first body 1511 and the second body 1512 may be formed in various injection molding processes (for example, dual injection molding, insert injection molding, and the like). In addition, the second body 1512 may be separately manufactured and attached to the first body 1511.

The plug insertion passage 1510 may be formed by combining the first body 1511 and the second body 1512. In addition, the terminal installation part 1520 (FIG. 9) may be formed by combining the first body 1511 and the second body 1512.

Figure 11:
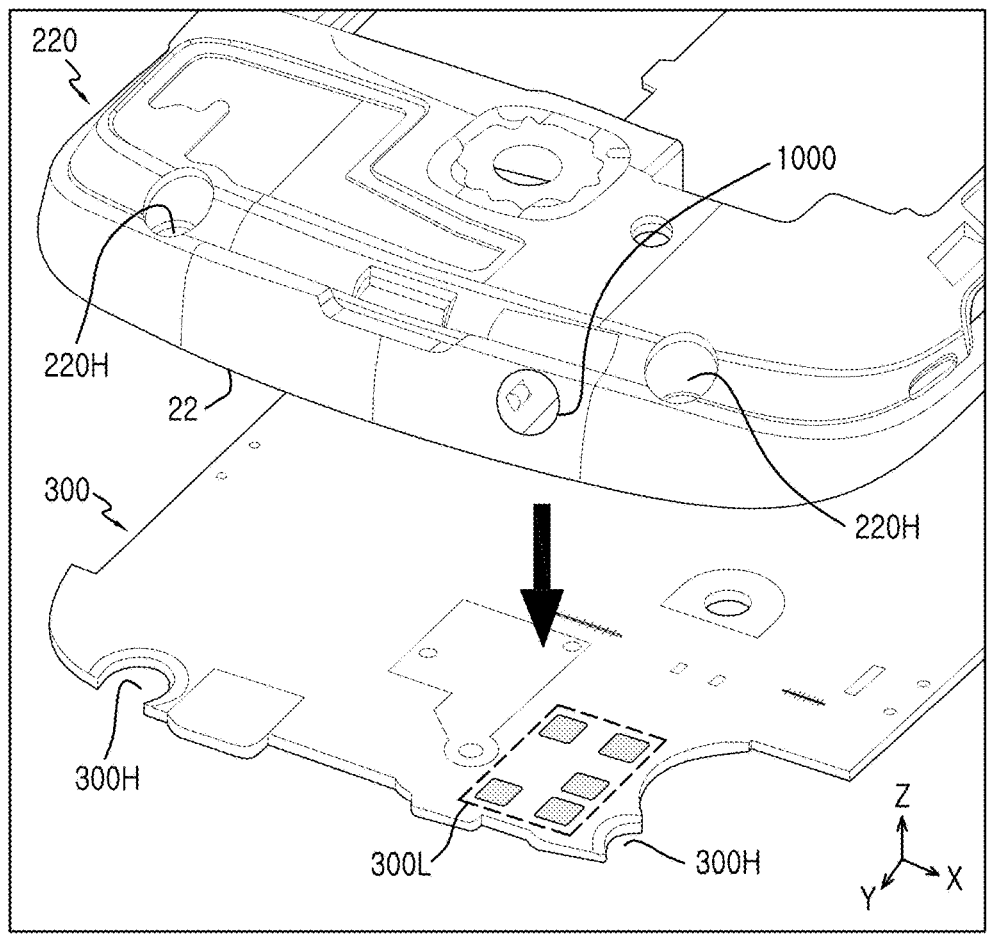
FIG. 11 is a perspective view of a device case shown relative to a main circuit board in a disassembly state according to an embodiment of the present disclosure.

FIG. 11 is a perspective view of a device case shown relative to a main circuit board in a disassembly state according to an embodiment of the present disclosure.

Referring to FIG. 11, the main circuit board 300 may be disposed under the lower part 22 of the device case 220. The main circuit board 300 may include a bolt fastening hole 300H and a plurality of lands (for example, a thin copper pad) 300L.

The bolt fastening hole 300H may be disposed to correspond to the plurality of bolt fastening holes 220H of the device case 220 and may be used for bolt fastening.

The plurality of lands 300L may be disposed to correspond to the first terminal part 601 (FIG. 6) of the socket 1000. The first terminal part 601 of the socket 1000 of the device case 220 may electrically contact the plurality of lands 300L of the main circuit board 300 by elastically pressing the plurality of lands 300L of the main circuit board 300.

Figure 12:
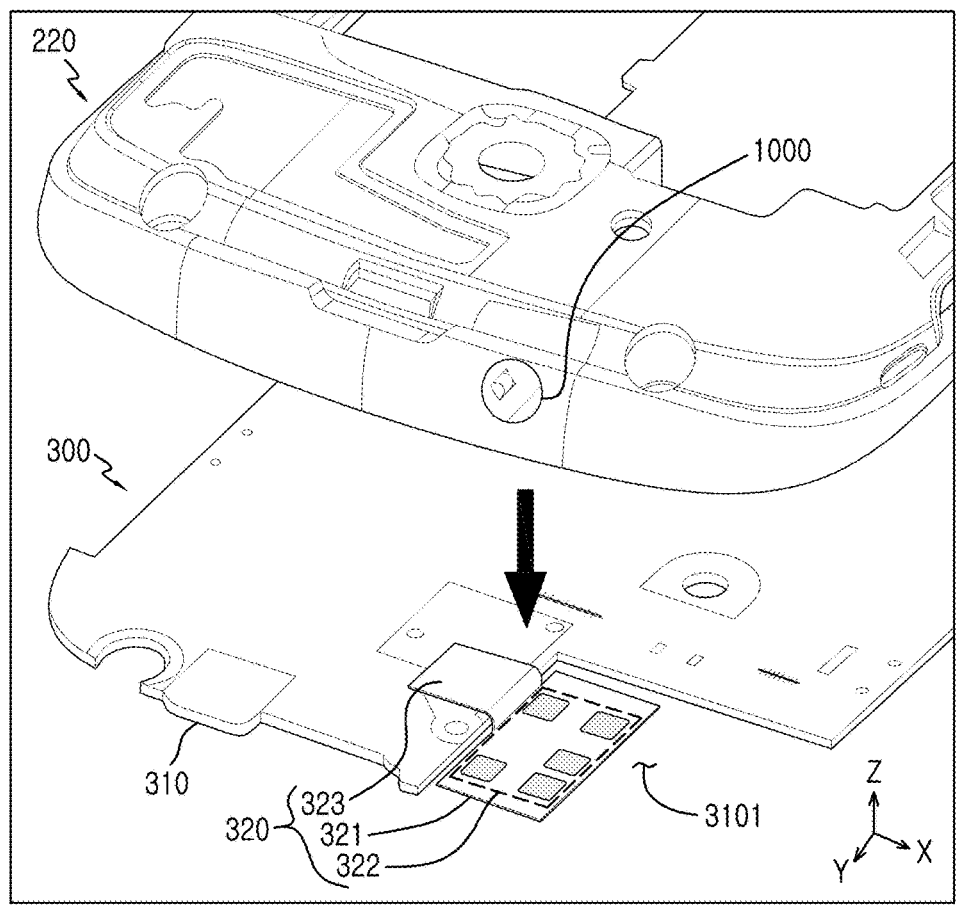
FIG. 12 is a perspective view of the device case and the main circuit board of FIG. 11 and of an extension part.

FIG. 12 is a perspective view of the device case and the main circuit board of FIG. 11 and of an extension part.

Referring to FIG. 12, the main circuit board 300 may include a first board 310 and a second board 320.

The first board 310 may include an empty space 3101.

The second board 320 may include a board 321, a plurality of lands 322, and an extension part 323. The board 321 may be disposed in the empty space 3101 of the first board 310. The plurality of lands 322 may be mounted on a surface of the board 321 and may be disposed to correspond to the first terminal part (for example, 601 of FIG. 6) of the socket 1000. The first terminal part 610 of the device case 220 may electrically contact the plurality of lands 322 of the main circuit board 300 by elastically pressing the plurality of lands 322 of the second board 320. The extension part 323 may extend from one side of the board 321 and may include a plurality of wires, which may be electrically connected with the plurality of lands 322. The plurality of lands 322 of the second board 320 may be electrically connected with the first board 310 via the extension part 323. The extension part 323 may be electrically connected with the first board 310 by having at least part thereof overlap with the first board 310. For example, the extension part 323 may include a connector (for example, a plug or a socket) to electrically connect with the first board 310.

The second board 320 may have a thickness thinner than that of the first board 310. For example, the second board 320 may include a Flexible Printed Circuit Board (FPCB). A space that the second board 320 does not occupy may be used as a mounting space for other parts.

Figure 13:
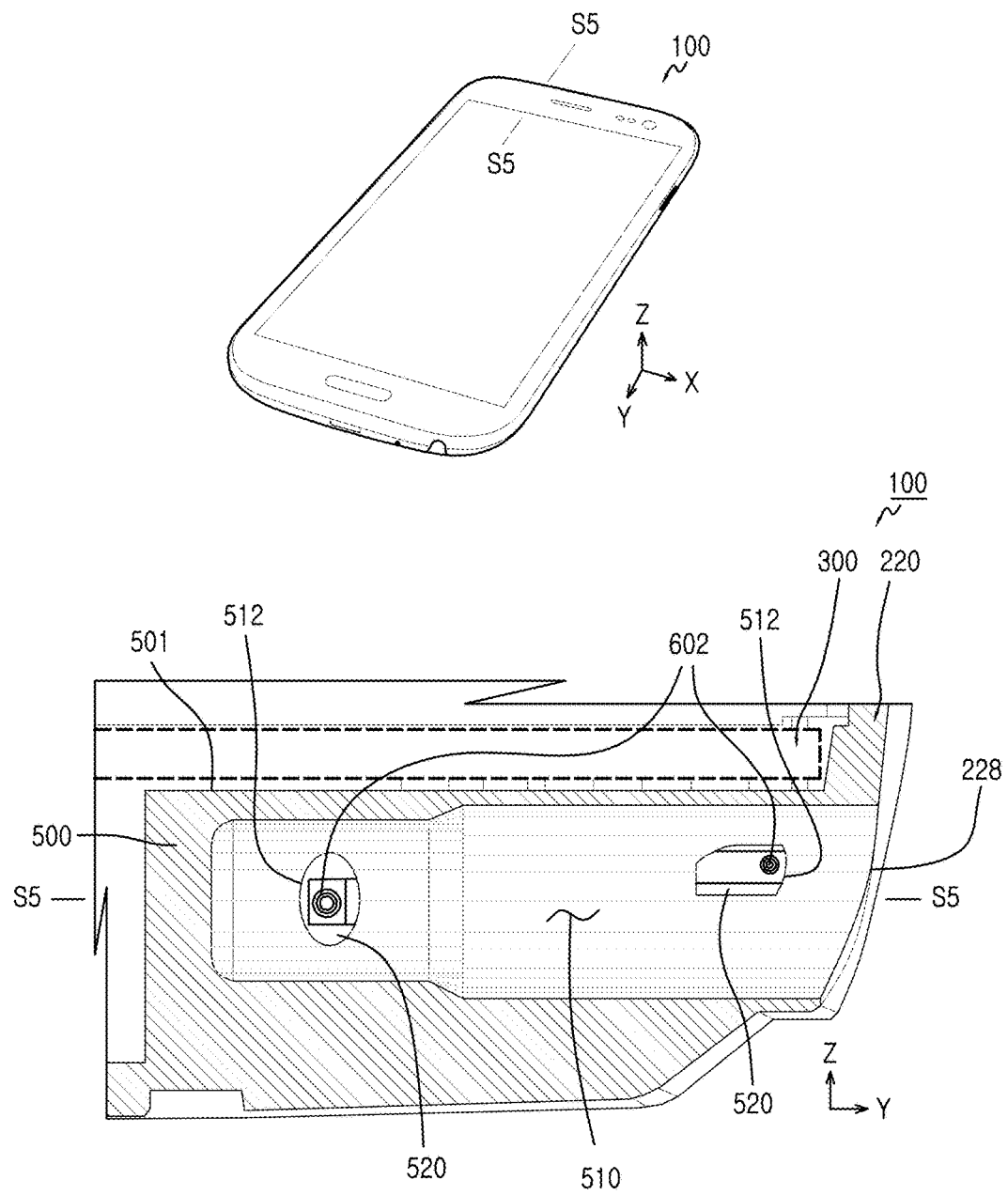
FIG. 13 is a cross-sectional view of the electronic device of FIG. 1 taken along sectional line S5-S5.

FIG. 13 is a cross-sectional view of the electronic device of FIG. 1 taken along sectional line S5-S5.

Referring to FIG. 13, the electronic device 100 may include the device case 220 and the main circuit board 300.

The device case 220 may include the plug insertion passage 510 and the terminal installation part 520. Some parts of the second terminal part 602 of the plurality of terminal members 600 may protrude into the plug insertion passage 510 via a connection part 512 between the plug insertion passage 510 and the terminal installation part 520.

A plug of an external device (for example, a headset or earphones) may be inserted through the opening 228 of the device 220 and may be disposed in the plug insertion passage 510. The second terminal part 602 may electrically contact the plug by elastically pressing the plug.

The main circuit board 300 may be connected with the device case 220 and thus may be electrically connected with the first terminal part 601 (FIG. 6), which protrudes from the surface of the socket body 500 of the device case 220.

In addition, when a plurality of terminals (for example, terminal 600 of FIG. 6) may be installed in the terminal installation part 520, a sealing member (not shown) may be additionally installed in the terminal installation part 520 without hindering movements (for example, elastically bending) of the first terminal part 601 (FIG. 6) and the second terminal part 602. When a foreign substance (for example, water) enters the plug insertion passage 510 through the opening 228, the foreign substance does not move out of the socket body 500 through the connection part 512 between the plug insertion passage 510 and the terminal installation part 520.

In addition, although not shown, a sealing member (for example, a sealing member of a rectangular ring shape) may be disposed between the main circuit board 300 and the top surface of the socket body 500 (the surface 501 on which the first terminal part 601 may be disposed) in close contact with them. A space which may be enclosed by the main circuit board 300, the top surface 501 of the socket body 500, and the sealing member may be formed. A foreign substance may enter this space through the connection part 512 between the plug insertion passage 510 and the terminal installation part 520, but does not move further into the electronic device 100 out of this space.

Figure 14:
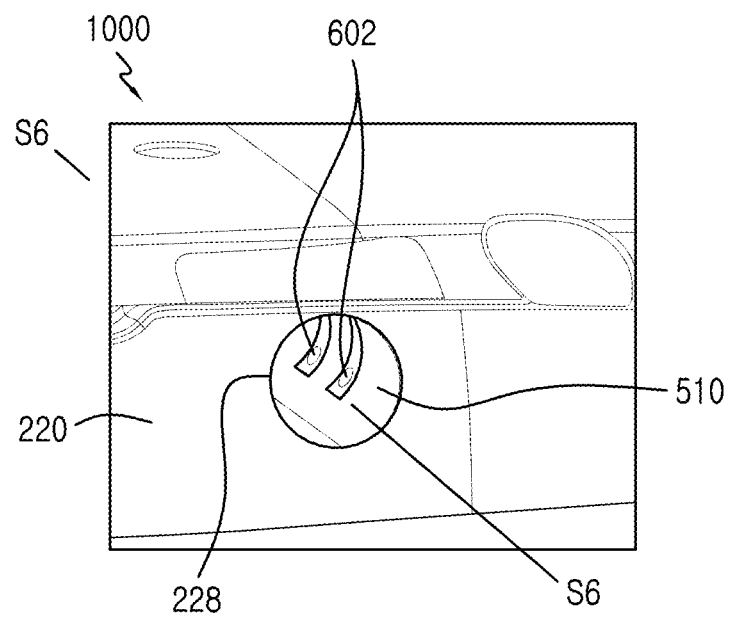
FIG. 14 is a perspective view of a portion of a device case and a cross-sectional view of the device case showing a socket according to an embodiment of the present disclosure.
Figure 14:
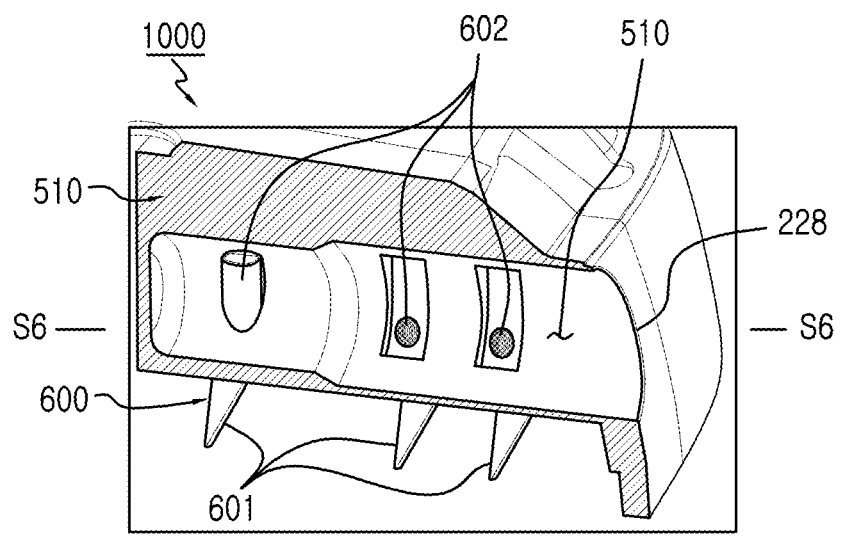

FIG. 14 is a perspective view of a portion of a device case and a cross-sectional view of the device case showing a socket according to an embodiment of the present disclosure.

Referring to FIG. 14, the socket 1000 may include the socket body 500 and the plurality of terminal members 600.

The socket body 500 may be a part of the device case 220. The socket body 500 may include the plug insertion passage 510 including the opening 228 which may be opened to the outside.

The plurality of terminal members 600 may be mounted in the socket body 500, and some of the terminal members (first terminal part 601) protrude into the outside of the socket body 500 and some other members (second terminal part 620) may protrude into the plug insertion passage 510.

Figure 15:
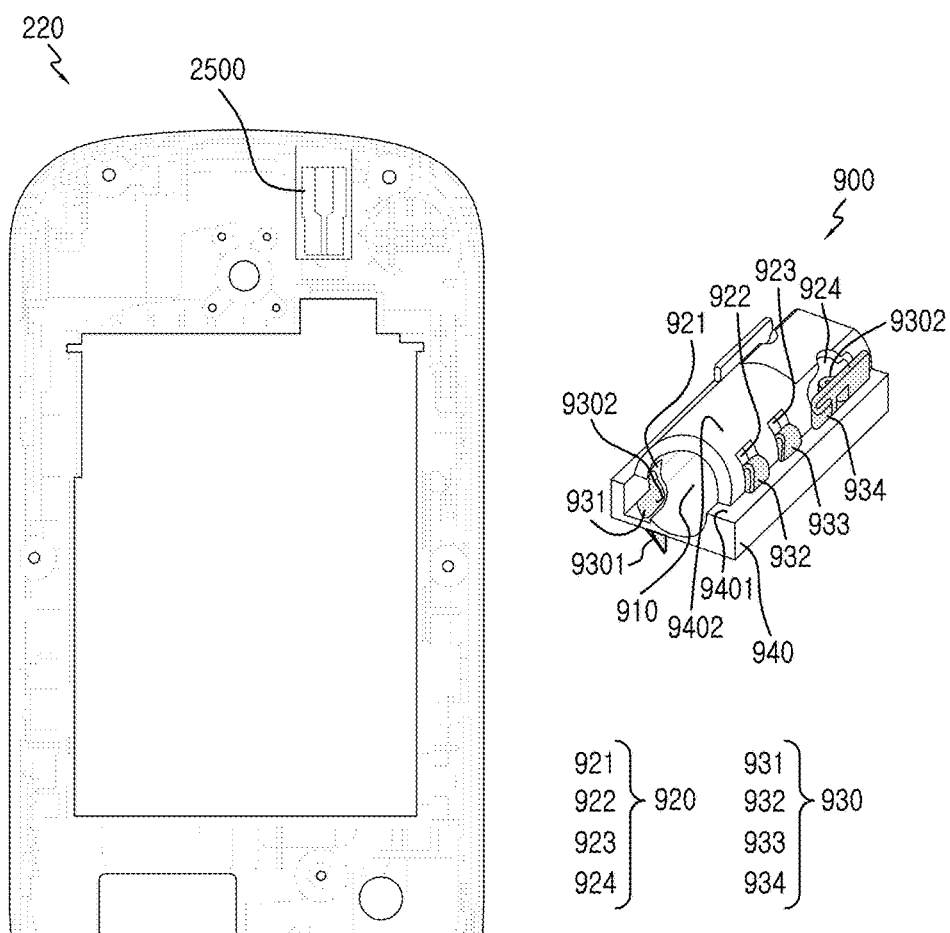
FIG. 15 is a back view of a device case shown relative to a socket according to an embodiment of the present disclosure.

FIG. 15 is a back view of a device case shown relative to a socket according to an embodiment of the present disclosure.

Referring to FIG. 15, the device case may include a socket connection part 2500.

The socket connection part 2500 may include a form to connect with at least part of a socket element 900. For example, the socket connection part 2500 may include a protrusion form and a recess form. The socket connection part 2500 may include a flat surface or a curved surface.

The socket element 900 may include a body 940, a plug insertion passage 910, a terminal installation part 920, and a plurality of terminal members 930.

The body 940 may form an exterior of the socket element 900. At least part of the body 940 may include a form to be connected with the socket connection part 2500 of the device case 220. For example, the body 940 may include a flat surface 9401 or a curved surface 9402, which contacts the socket connection part 2500.

The plug insertion passage 910 may be formed in the body 940 and may be a part into which a plug of an external device (not shown) (for example, a headset or earphones) may be inserted and disposed.

The terminal installation part 920 may be formed on the body 940 and may be a part in which the plurality of terminal members 930 may be installed, and may fluidly communicate with the plug insertion passage 910.

The plurality of terminal members 930 may be installed in the terminal installation part 920. Some of the plurality of terminal members 930 (first terminal part) 9301 protrude from the body 940 and some other terminal members 9302 (second terminal part) of the plurality of terminal members 930 may protrude into the plug insertion passage 910. The first terminal part 9301 or the second terminal part 9302 of the plurality of terminal members 930 may include an elastic terminal.

Figure 16:
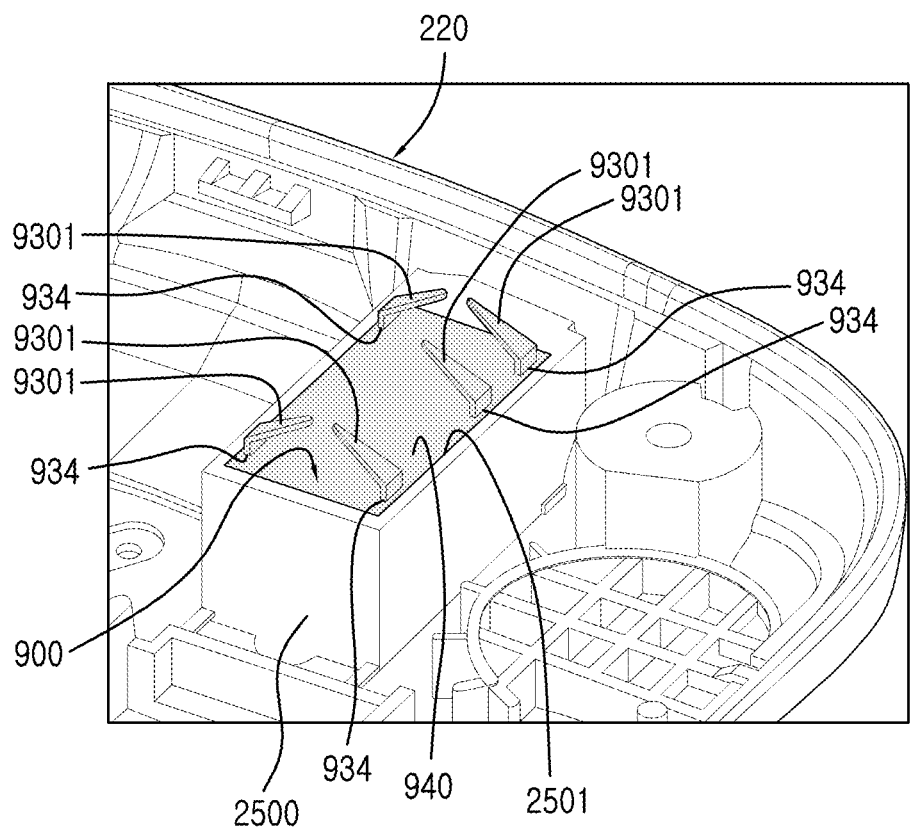
FIG. 16 is a perspective view of a socket element and a device case in an assembly state according to an embodiment of the present disclosure.

FIG. 16 is a perspective view of a socket element and a device case in an assembly state according to an embodiment of the present disclosure.

Referring to FIG. 16, the socket connection part 2500 of the device case 220 may include a connection recess 2501.

The body 940 of the socket element 900 may be fitted into the connection recess 2501 of the socket connection part 2500 of the device case 200. The first terminal part 9301 of the socket element 900 may protrude from the body 940. The first terminal part 9301 of the socket element 900 and the body 940 may be so close to each other that a gap 934 therebetween does not allow a foreign substance to pass therethrough. In addition, although not shown, the gap 934 between the first terminal part 9301 and the body 940 may be sealed so as not to allow a foreign substance to pass therethrough.

In addition, the socket connection part 2500 of the device case 220 and the body 940 of the socket element 900 may be so close to each other that a gap therebetween does not allow a foreign substance to pass therethrough. In addition, although not shown, the gap between the socket connection part 2500 of the device case 220 and the body 940 of the socket element 900 may be sealed so as not to allow a foreign substance to pass therethrough.

FIGS. 17 to 23 are cross-sectional views showing a socket element and a device case in an assembly state according to an embodiment of the present disclosure.

Figure 17:
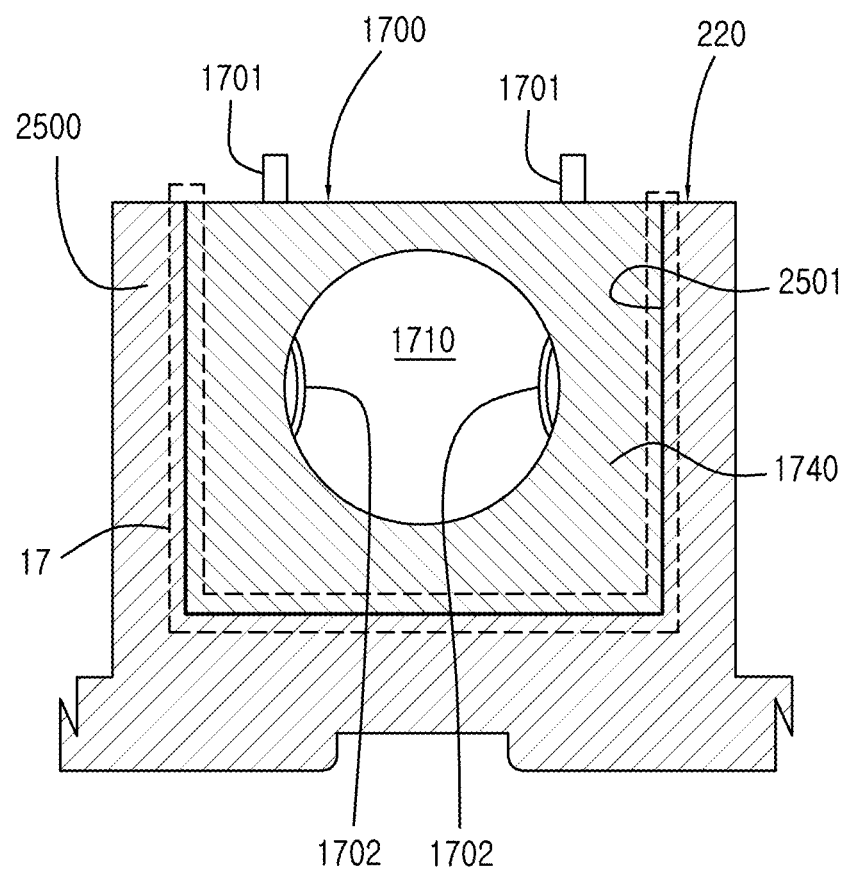
FIG. 17, FIG. 18, FIG. 19, FIG. 20, FIG. 21, FIG. 22 and FIG. 23 are cross-sectional views showing a socket element and a device case in an assembly state according to an embodiment of the present disclosure.

Referring to FIG. 17, a socket element 1700 may include a body 1740, a first terminal part 1701, a second terminal part 1702, and a plug insertion passage 1710. The body 1740 may be fitted into the connection recess 2501 of the device case 220. The body 1740 may not protrude relatively more than the device case 220. A gap 17 between the body 1740 and the connection recess 2501 of the device case 220 may include a multi-surface contact. A sealing member (for example, a double-sided tape or the like) may be interposed on the gap 17 between the body 1740 and the connection recess 2501 of the device case 220. The first terminal part 1701 may protrude relatively more than the body 1740, and at least part of the second terminal part 1702 may be disposed in the plug insertion passage 1710. The plug insertion passage 1710 may be formed in the body 1740.

Figure 18:
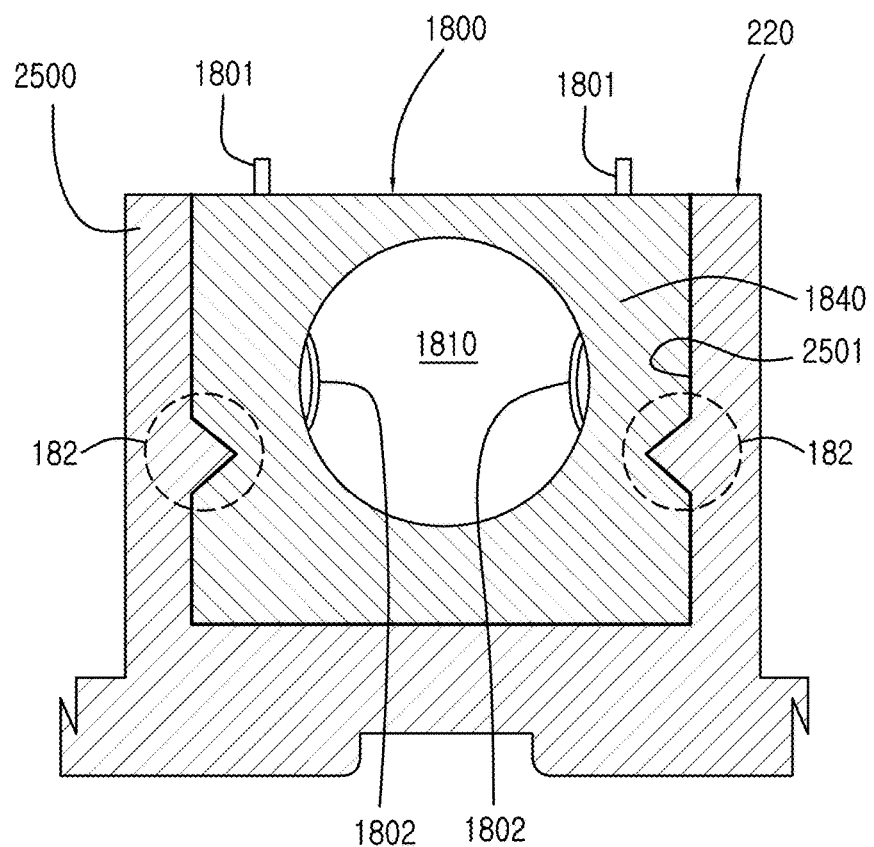

Referring to FIG. 18, a socket element 1800 may include a body 1840, a first terminal part 1801, a second terminal part 1802, and a plug insertion passage 1810. A connection configuration 182 including a protrusion and a protrusion recess may be provided between the body 1840 and the connection recess 2501 of the device case 220. The first terminal part 1801, the second terminal part 1802, and the plug insertion passage 1810 may correspond to the elements 1701, 1702, and 1710 of FIG. 17.

Figure 19:
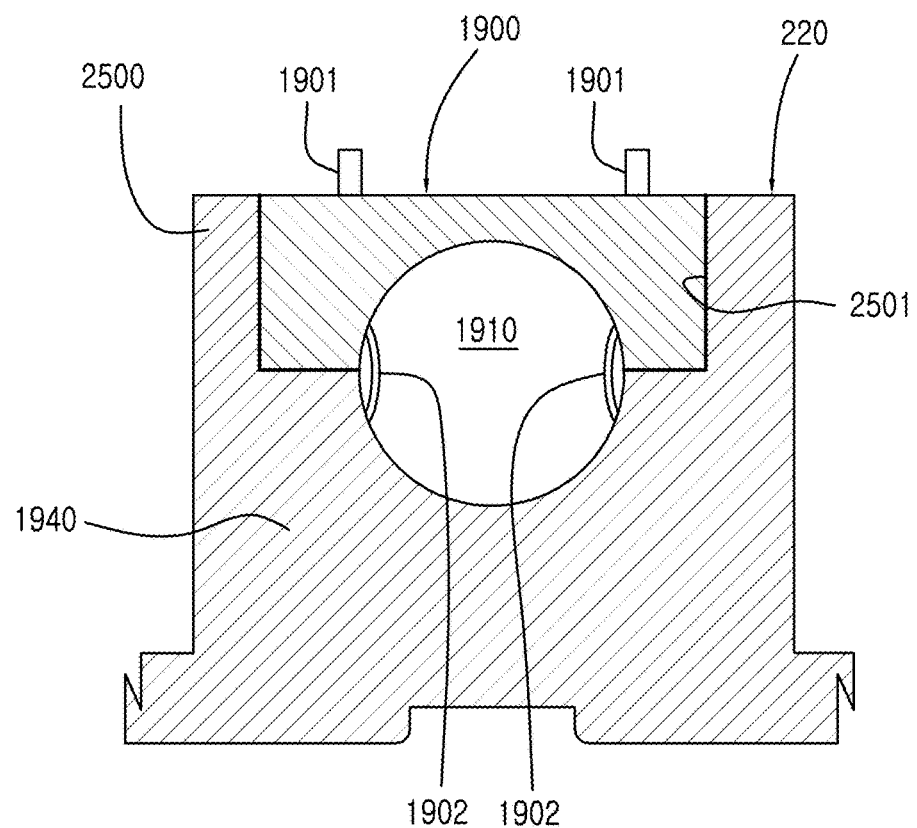

Referring to FIG. 19, a socket element 1900 may include a body 1940, a first terminal part 1901, a second terminal part 1902, and a plug insertion passage 1910. The plug insertion passage 1910 may be formed by a combination of the body 1940 of the socket element 1900 and the connection recess 2501 of the device case 220. The first terminal part 1901 of the socket element 1900 may protrude relatively more than the body 1940 and at least part of the second terminal part 1902 of the socket element 1900 may be disposed in the plug insertion passage 1910.

Figure 20:
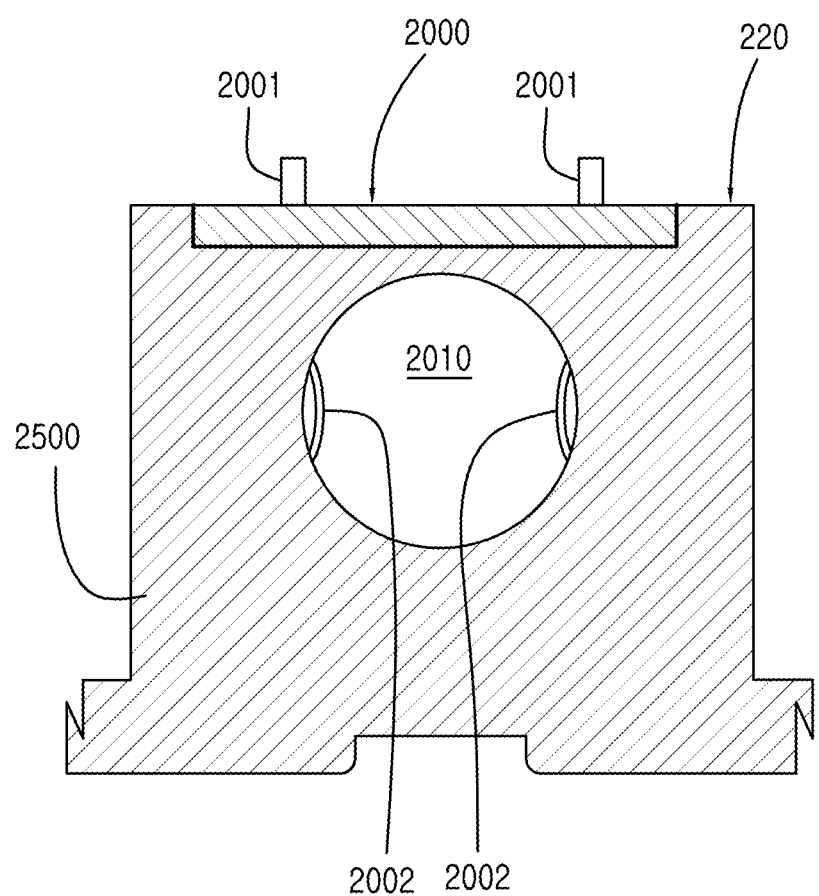

Referring to FIG. 20, a socket element 2000 may include a first terminal part 2001 and a second terminal part 2002. The socket connection part 2500 of the device case 220 may include a plug insertion passage 2010. The first terminal part 2001 of the socket element 2000 may protrude relatively more than a body 2040 and at least part of the second terminal part 2002 of the socket element 2000 may be disposed in the plug insertion passage 2010 of the device case 220.

Figure 21:
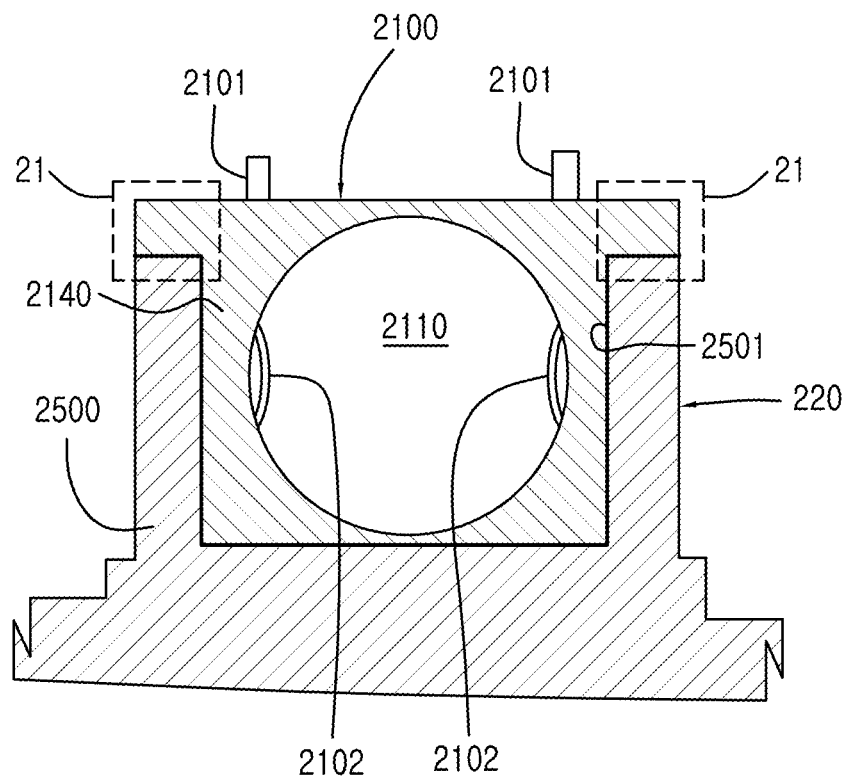

Referring to FIG. 21, a socket element 2100 may include a body 2140, a first terminal part 2101, a second terminal part 2102, and a plug insertion passage 2110. The body 2140 may include an extension part 21 extending around the connection recess 2501 of the device case 220. The extension part 21 may cover at least part of the socket connection part 2500 of the device case 220. The first terminal part 2101, the second terminal part 2102, and the plug insertion passage 2110 may correspond to the elements 1701, 1702, and 1710 of FIG. 17.

Figure 22:
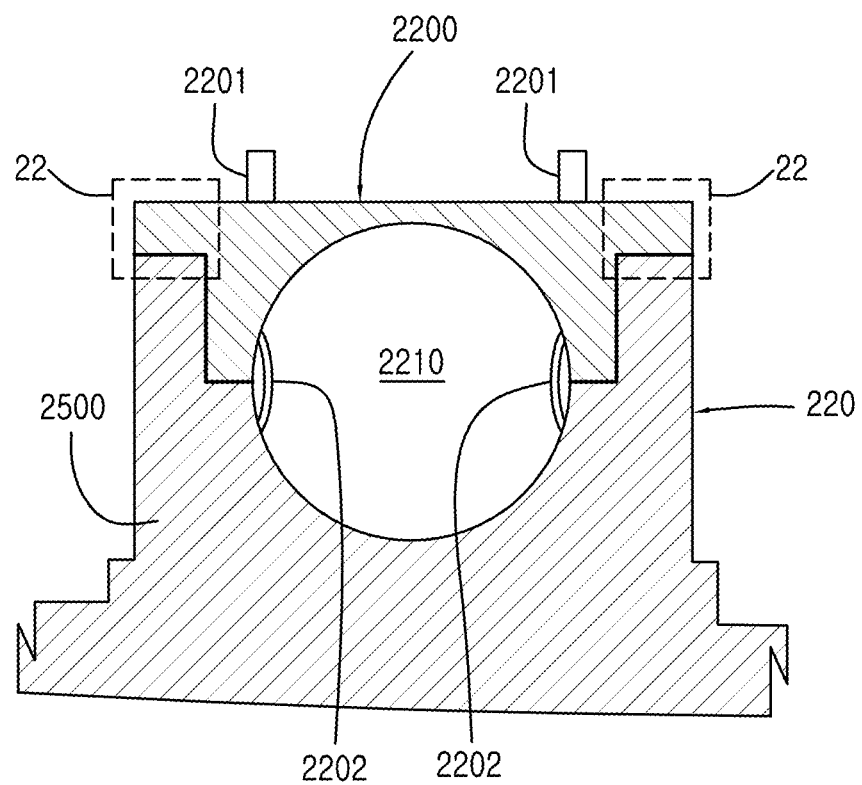

Referring to FIG. 22, a socket element 2200 may include a body 2240, a first terminal part 2201, a second terminal part 2202, and a plug insertion passage 2210. The body 2240 may further include an extension part 22 extending around the connection recess 2501 of the device case 220. The plug insertion passage 2210 may be formed by a combination of the body 2240 of the socket element 2200 and the socket connection part 2500 of the device case 220. The first terminal part 2201 and the second terminal part 2202 of the socket element 2200 may correspond to the elements 1901 and 1902 of FIG. 19.

Figure 23:
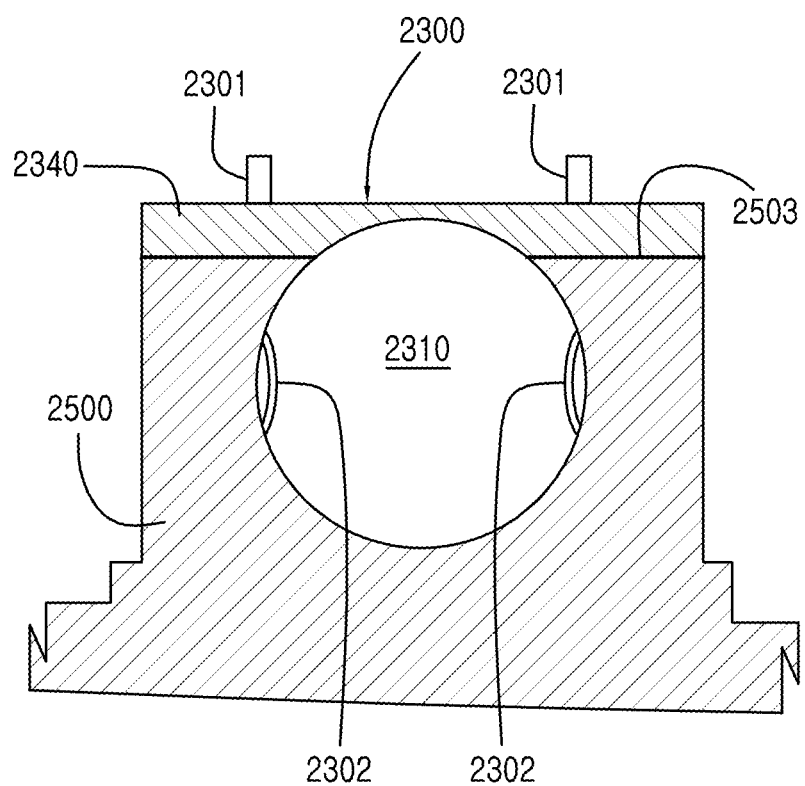

Referring to FIG. 23, a socket element 2300 may include a body 2340, a first terminal part 2301, a second terminal part 2302, and a plug insertion passage 2310. The plug insertion passage 2310 may be formed by a combination of the body 2340 of the socket element 2300 and the socket connection part 2500 of the device case 220. The body 2340 may be formed to cover an upper part 2503 of the socket connection part 2500 of the device case 220. The first terminal part 2201 and the second terminal part 2202 of the socket element 2200 may correspond to the elements 1901 and 1902 of FIG. 19.

Figure 24:
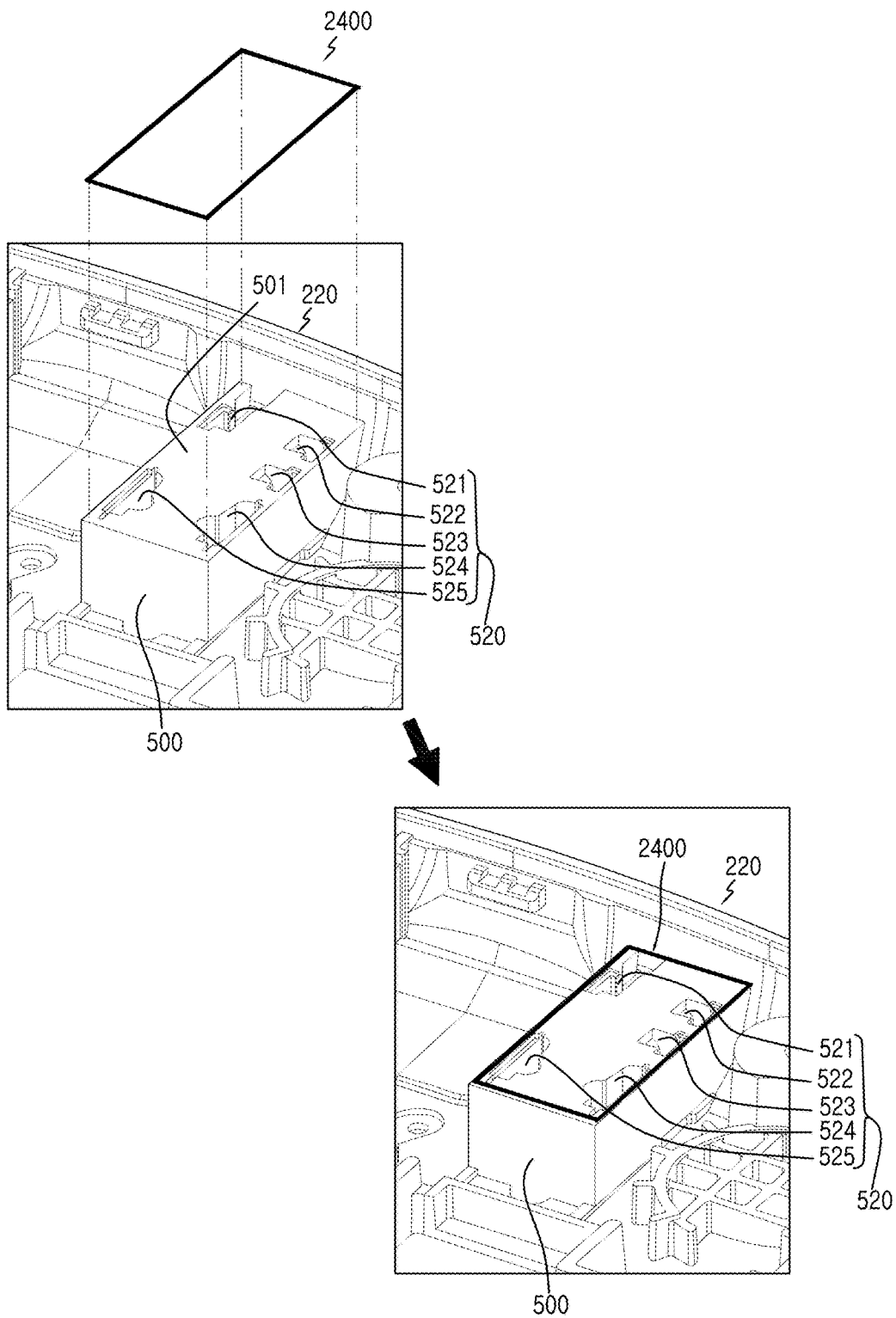
FIG. 24 and FIG. 25 are perspective views of a part of a device case and a socket according to an embodiment of the present disclosure.

FIG. 24 is a perspective view of a device case according to an embodiment of the present disclosure.

Referring to FIG. 24, a sealing member 2400 may be disposed on the upper part 501 of the socket body 500 of the device case 220. The sealing member 240 may be formed in a ring shape (for example, a rectangular ring shape) to enclose the terminal installation part 520. Although not shown, when the device case 220 may be connected with the main circuit board 300, a space, which may be enclosed by the upper part 501 of the socket body 500, the main circuit board 300, and the sealing member 2400 may be formed. A foreign substance may enter this space through the terminal installation part 520, but does not move further into the electronic device 100 out of this space.

Figure 25:
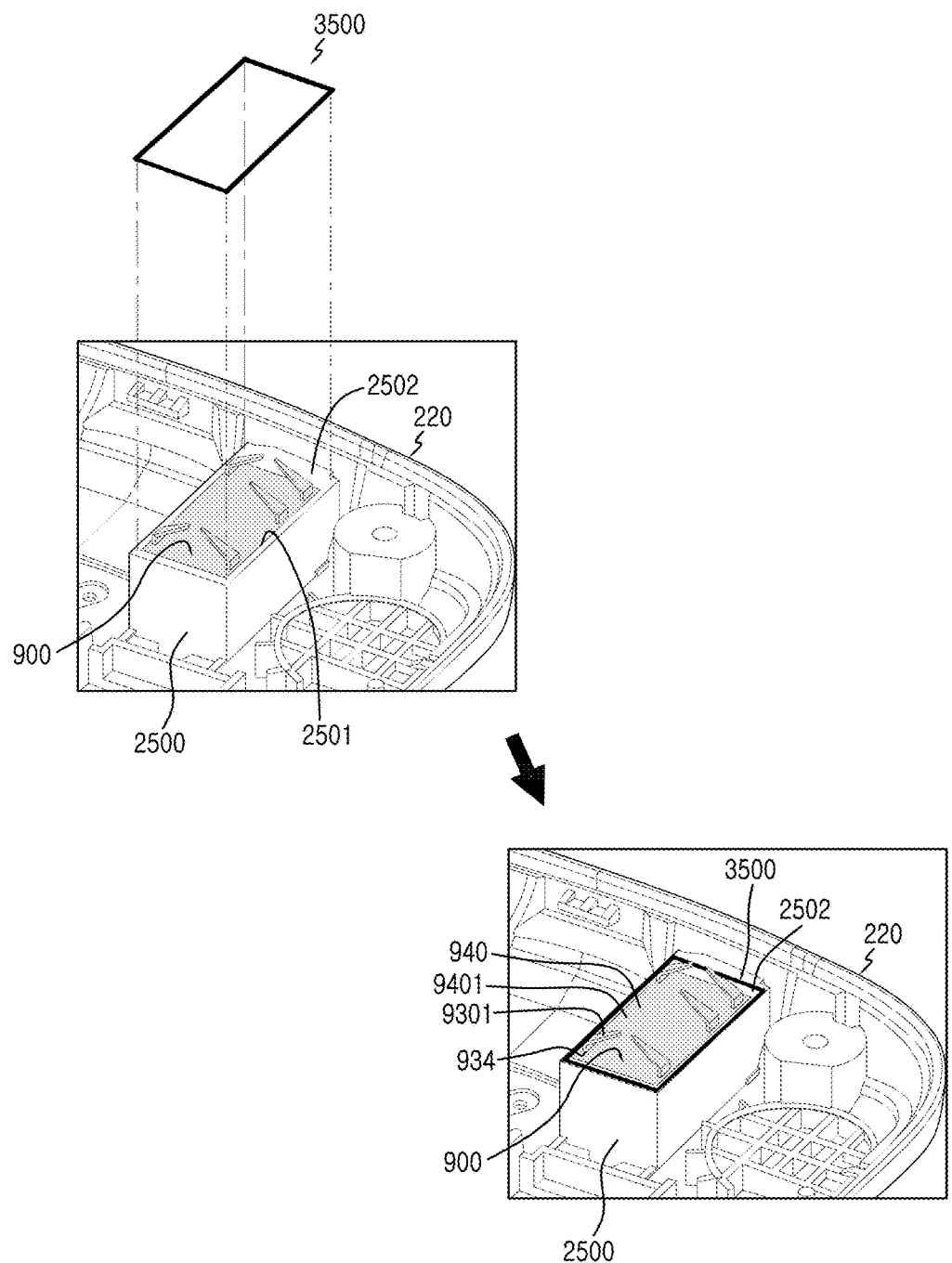

FIG. 25 is a perspective device case according to an embodiment of the present disclosure.

Referring to FIG. 25, the socket element 900 may be mounted in the socket connection part 2500 of the device case 220. In addition, a sealing member 3500 may be disposed on an upper part 2502 of the socket connection part 2500 of the device case 220. Although not shown, the upper part 2502 of the socket connection part 2500 may include a recess to have a part of the sealing member 3500 seated therein.

Figure 26:
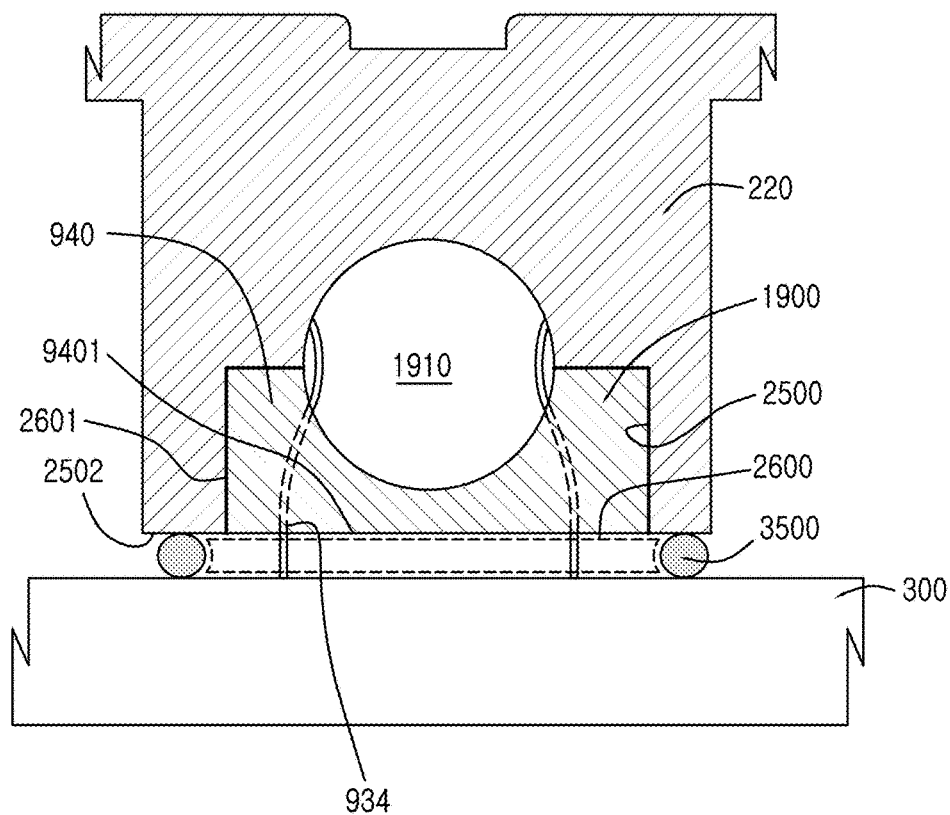
FIG. 26 is a cross-sectional view showing a socket, a device case, and a main circuit board in an assembly state according to an embodiment of the present disclosure.

FIG. 26 is a cross-sectional view showing a socket, a device case, and a main circuit board in an assembly state according to an embodiment of the present disclosure.

Referring to FIG. 26, the socket element 1900 may be mounted in the device case 220 by being fitted into the socket connection part 2500 of the device case 220. The sealing member 3500 may be disposed between the socket connection part 2500 of the device case 220 and the main circuit board 300. A space 2600 which may be enclosed by one surface 2502 of the socket connection part 2500 of the device case 220, one surface 9401 of the socket element 900, the main circuit board 300, and the sealing member 3500 may be formed. A foreign substance may enter a gap 2601 between the socket connection part 2500 of the device case 220 and the body 940 of the socket element 900. However, the foreign substance is prevented or inhibited from moving farther into the electronic device 100 out of the space 2600. In addition, a foreign substance may enter a gap 934 between the first terminal part 9301 of the socket element 900 and the body 940, but does not move further into the electronic device 100 out of the space 2600.

Figure 27:
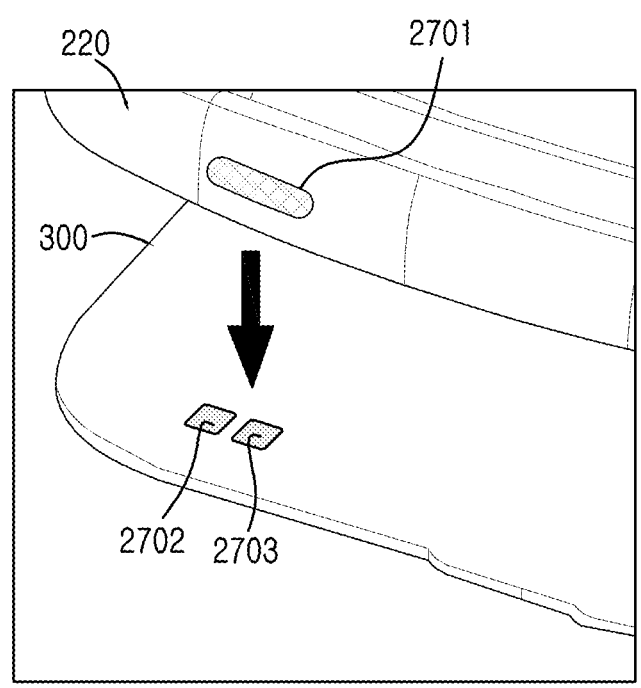
FIG. 27 and FIG. 28 are perspective views showing a device case and a main circuit board in an assembly state according to an embodiment of the present disclosure.

FIG. 27 is a perspective view of a device case and a main circuit board in an assembly state according to an embodiment of the present disclosure.

Referring to FIG. 27, the device case 220 may have a speaker device (not shown) mounted therein. The device case 220 may include a sound discharge passage (not shown) for the speaker device. The sound discharge passage may include a sound outlet 2701 which may be opened to the outside. The main circuit board 300 may include a plurality of lands 2702 and 2703, which may electrically contact terminals (not shown) of the speaker device of the device case 220. A foreign substance may enter the sound discharge passage through the sound outlet 2701, but does not move further into the electronic device 100 out of the sound discharge passage.

Figure 28:
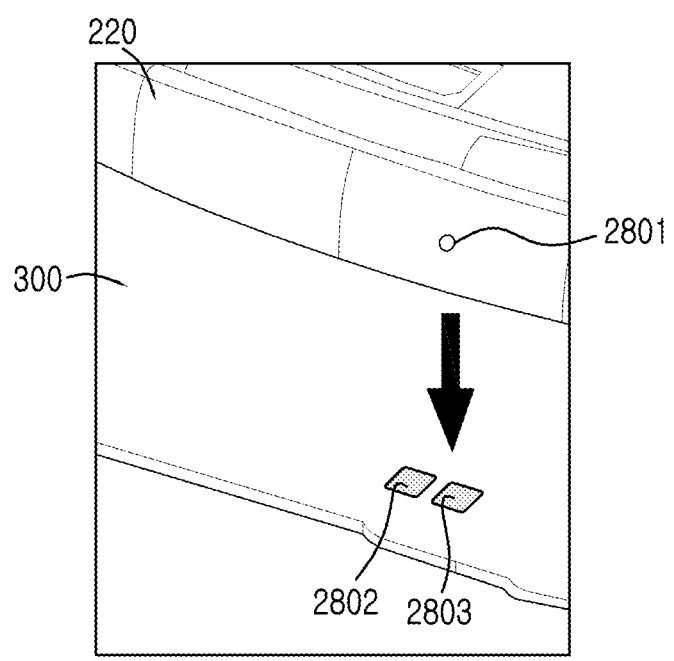

FIG. 28 is a perspective view of a device case and a main circuit board in an assembly state according to an embodiment of the present disclosure.

Referring to FIG. 28, the device case 220 may have a microphone device (not shown) mounted therein. The device case 220 may include a sound entering passage (not shown) for the microphone device. The sound entering passage may include a sound inlet 2801, which may be opened to the outside. The main circuit board 300 may include a plurality of lands 2802 and 2803, which may electrically contact terminals (not shown) of the microphone device of the device case 220. A foreign substance may enter the sound entering passage through the sound inlet 2801, but does not move further into the electronic device 100 out of the sound entering passage.

Figure 29:
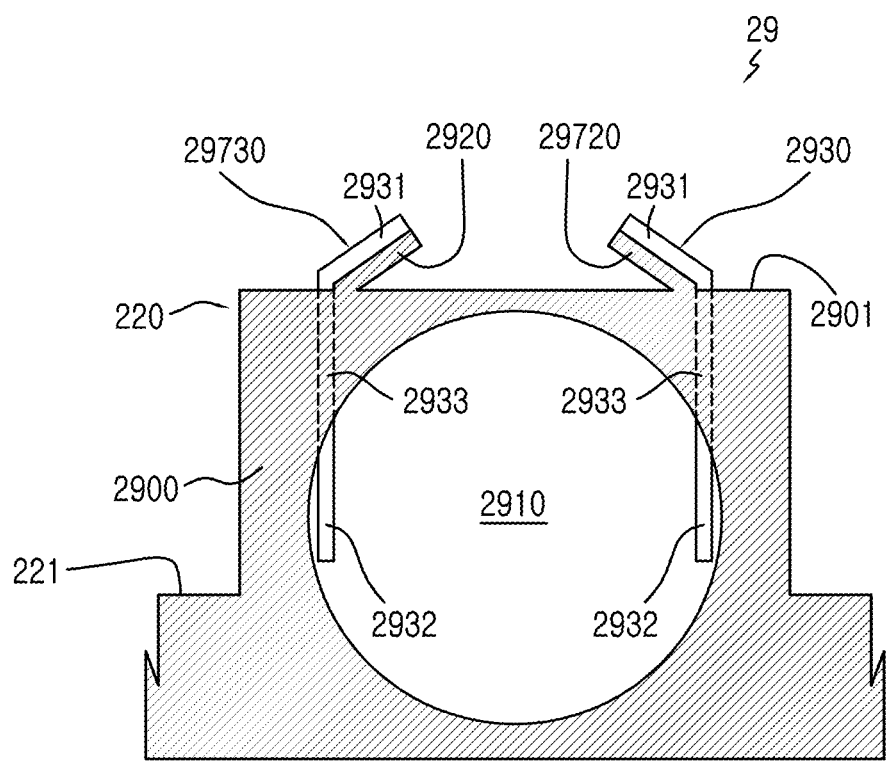
FIG. 29, FIG. 30 and FIG. 31 are cross-sectional views showing a socket according to an embodiment of the present disclosure.
Figure 30:
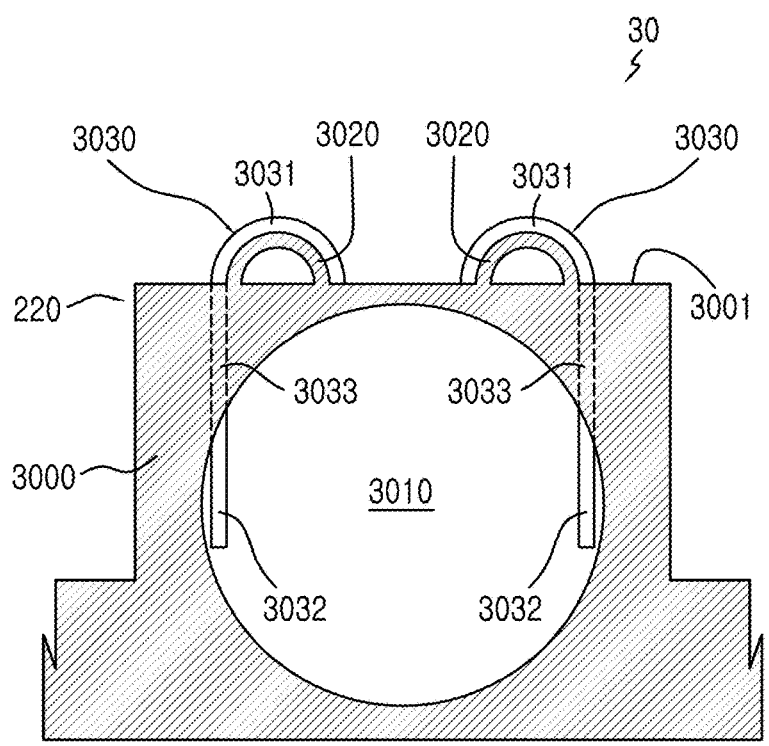
Figure 31:
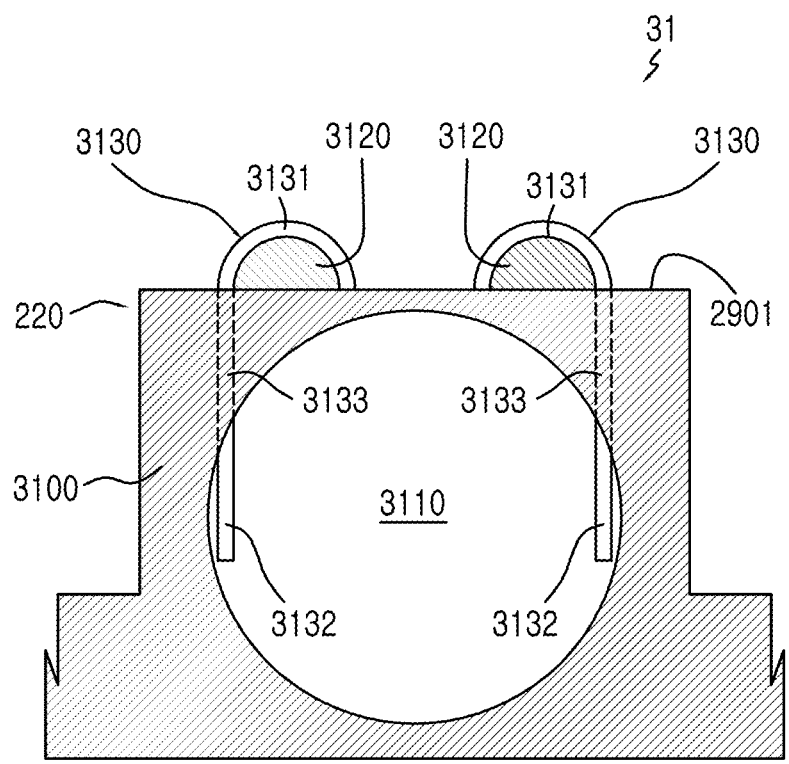

FIGS. 29 to 31 are cross-sectional views of a socket according to an embodiment of the present disclosure.

Referring to FIG. 29, a socket 29 may include the device case 220 and a plurality of terminal members 2930.

The device case 220 may include a socket body 2900, a plug insertion passage 2910, and an elastic form 2920. The socket body 2900 may protrude and extend from the bottom surface 221. The plug insertion passage 2910 may be formed in the socket body 2900. The elastic form 2920 slantingly protrudes from an upper part 2901 of the socket body 2900 and may be elastically bendable.

The plurality of terminal members 2930 may include a first terminal part 2931, a second terminal part 2932, and a connection part 2933. The first terminal part 2931 may be disposed on the elastic form 2920 of the device case 220. The first terminal part 2931 may electrically contact the main circuit board 300 (not shown) by using elasticity of the elastic form 2920. The second terminal part 2932 may be disposed in the plug insertion passage 2910 of the device case 220. The second terminal part 2932 may electrically contact a plug (not shown) which may be inserted into the plug insertion passage 2910. The connection part 2933 may be a part to electrically connect the first terminal part 2931 and the second terminal part 2932 and may be disposed in the socket body 2900.

The plurality of terminal members 2930 may be added to the device case 220 by metallic painting.

In addition, the elastic form 2920 and the plurality of terminal members 2930 may be formed by Laser Direct Structuring (LDS).

Referring to FIG. 30, a socket 30 may include the device case 220 and a plurality of terminal members 3030.

The device case 220 may include a socket body 3000, a plug insertion passage 3010, and an elastic form 3020. The socket body 3000 and the plug insertion passage 3010 may correspond to the elements 2900 and 2910 of FIG. 29. The elastic form 3020 may include a dome form extending from an upper part 3001 of the socket body 300 and may be elastically bendable.

The plurality of terminal members 3030 may include a first terminal part 3031, a second terminal part 3032, and a connection part 3033. The first terminal part 3031 may be disposed on the elastic form 3020 of the device case 220. The first terminal part 3031 may electrically contact the main circuit board 300 (not shown) by using elasticity of the elastic form 3020. The second terminal part 3020 and the connection part 3033 may correspond to the elements 2920 and 2933 of FIG. 29.

Referring to FIG. 31, a socket 31 may include the device case 220 and a plurality of terminal members 3130.

The device case 220 may include a socket body 3100, a plug insertion passage 3110, and an elastic member 3120. The socket body 3100 and the plug insertion passage 3110 may correspond to the elements 2900 and 2910 of FIG. 29. The elastic member 3120 may include a dome form, which may be attached to an upper part 3001 of the socket body 3100 and may be elastically bendable. The elastic member 3120 may be added to the device case 220 by a dual injection molding process. In addition, the elastic member 3120 may be separately manufactured and attached to the device case 220.

The plurality of terminal members 3130 may include a first terminal part 3131, a second terminal part 3132, and a connection part 3133. The first terminal part 3131 may be disposed on the elastic member 3120 of the device case 220. The first terminal part 3131 may electrically contact the main circuit board 300 (not shown) by using elasticity of the elastic member 3120. The second terminal part 3120 and the connection part 3133 may correspond to the elements 2920 and 2933 of FIG. 29.

According to various embodiments of the present disclosure, the electronic device 100 may include: a housing (for example, the device case 220) which includes an opening 228 formed on an outer surface (for example, the side surface 12) and a space (for example, the plug insertion passage 510) fluidly communicating with the opening 228; at least one electronic element (for example, the second terminal part 602) which may be disposed in the space 510; and at least one terminal (for example, the first terminal part 601) which may be disposed outside the housing 220 and may be electrically connected with the at least one electronic element 602.

According to various embodiments of the present disclosure, the housing (for example, the device case 220) may include an installation part (for example, the terminal installation part 520) which fluidly communicates with the space (for example, the plug insertion passage 510), and an electric connection part (for example, the connection part 603) between the at least one electronic element (for example, the second terminal part 602) and the at least one terminal (for example, the first terminal part 601) may be disposed in the installation part 520.

According to various embodiments of the present disclosure, the electronic device 100 may further include a sealing member, which may be interposed between the electric connection part (for example, the connection part 603) and the installation part (for example, the terminal installation part 520).

According to various embodiments of the present disclosure, the electronic device 100 may further include a main circuit board 300 which electrically contacts the at least one terminal 1601.

According to various embodiments of the present disclosure, the main circuit board 300 may include a plurality of boards (for example, the first board 310 and the second board 320), and one of the plurality of boards (for example, the second board 320) electrically contacts the at least one terminal 601.

According to various embodiments of the present disclosure, the board 320 electrically connected with the at least one terminal 601 may be thinner than the other boards in thickness.

According to various embodiments of the present disclosure, the electronic device 100 may further include a sealing member 2400, 3500 which may be disposed between the housing 220 and the main circuit board 300, and encloses an electric contact part between the at least one terminal 601 and the main circuit board 300.

According to various embodiments of the present disclosure, the at least one terminal 601 may be elastically deformable.

According to various embodiments of the present disclosure, the at least one terminal 601 may include an elastic piece 601 or a pogo pin 801.

According to various embodiments of the present disclosure, the housing 220 may further include an elastic member 3120 to which the at least one terminal 601 may be attached.

According to various embodiments of the present disclosure, the housing 220 may include an elastic form 2920, 3020 to which the at least one terminal 601 may be attached.

According to various embodiments of the present disclosure, the at least one terminal 601 and the elastic form 2920, 3020 may be formed by LDS.

According to various embodiments of the present disclosure, the housing (for example, the socket body 1500) may include a first housing (for example, the first body 1511), and a second housing (for example, the second body 1512) which may be connected with the first housing 1511 and includes at least part of the space 510.

According to various embodiments of the present disclosure, the second housing 1512 may be formed by a dual injection molding process According to various embodiments of the present disclosure, the second housing 1512 may include a same material as that of the first housing 1511 or a different material.

According to various embodiments of the present disclosure, the first housing 1511 or the second housing 1512 may include a conductive material or a nonconductive material.

According to various embodiments of the present disclosure, the first housing 1511 and the second housing 1512 may be connected with each other via an adhesive sealing member.

According to various embodiments of the present disclosure, a connection part of the first housing 1511 and the second housing 1512 may include a connection configuration 182 including a protrusion and a protrusion recess.

According to various embodiments of the present disclosure, the electronic element may include at least one terminal (for example, the second terminal part 602), which electrically contacts or connects a plug inserted into the space 510 through the opening 228.

According to various embodiments of the present disclosure, the electronic element may include an image-related device (for example, a camera, various sensors, and the like), a voice-related device (for example, a speaker device, a microphone device, or various sensors), and/or a sensor.

While the disclosure has been shown and described with reference to certain preferred embodiments thereof, it will be understood by those skilled in the art that various changes in form and details may be made therein without departing from the spirit and scope of the invention as defined by the appended claims. Therefore, the scope of the disclosure is defined not by the detailed description of the invention but by the appended claims, and all differences within the scope will be construed as being included in the present disclosure.

What is claimed is:

1. An electronic device comprising:
   a housing having an outer surface, an opening formed on the outer surface, and a space fluidly communicating with the opening;
   at least one electronic element adapted to be inserted into the space;
   at least one terminal disposed on the outer surface of the housing, the at least one terminal includes an installation part in communication with the space;
   an electric connection part disposed in the installation part for connecting the at least one electronic element with the electronic device, the electric connection part adapted to elastically deform when the at least one electronic element is inserted into the space; and
   a sealing member disposed on the at least one terminal, the sealing member includes another opening over the electric connection part to permit the elastic deformation of the electric connection part.

2. The electronic device of claim 1, wherein the sealing member is interposed between the electric connection part and the installation part.

3. The electronic device of claim 1, further comprising a circuit board electrically contacting the at least one terminal.

4. The electronic device of claim 3, wherein the circuit board comprises a plurality of boards, and wherein at least one of the plurality of boards electrically contacts the at least one terminal.

5. The electronic device of claim 4, wherein the at least one of the plurality of boards that is electrically connected with the at least one terminal is thinner than the boards that are not electrically connected with the at least one terminal.

6. The electronic device of claim 3, further comprising an electric contact part between the at least one terminal and the circuit board, the electric contact part being enclosed by the sealing member, wherein the sealing member is disposed between the housing and the circuit board.

7. The electronic device of claim 1, wherein the at least one terminal is elastically deformable.

8. The electronic device of claim 1, wherein the at least one terminal comprises at least one of an elastic piece and a pogo pin.

9. The electronic device of claim 1, wherein the housing further comprises an elastic member to which the at least one terminal is attached.

10. The electronic device of claim 1, wherein the housing further includes an elastic form to which the at least one terminal is attached.

11. The electronic device of claim 1, wherein the housing comprises a first housing and a second housing, and the second housing is connected to the first housing and comprises at least part of the space.

12. The electronic device of claim 11, wherein the first and second housings are formed from a material that is the same.

13. The electronic device of claim 11, wherein at least one of the first housing and the second housing include a conductive material.

14. The electronic device of claim 11, wherein the first housing and the second housing are connected to each other via an adhesive sealing member.

15. The electronic device of claim 11, further including a connection part for connecting the first and second housings, the connection part comprising a protrusion and a protrusion recess.

16. The electronic device of claim 1, wherein the electronic element at least one of the at least one terminals is configured to electrically connect with a plug when the plug is inserted into the space through the opening.

17. The electronic device of claim 1, wherein the electronic element comprises at least one of an image-related device, a voice-related device, and a sensor.

18. An electronic device comprising:
- a housing having an outer surface, an opening formed on the outer surface, and a space fluidly communicating with the opening;
- at least one electronic element adapted to be inserted into the space;
- at least one terminal disposed on the outer surface of the housing, the at least one terminal includes an installation part in communication with the space;
- an electric connection part disposed in the installation part for connecting the at least one electronic element with the electronic device, the electric connection part adapted to elastically deform when the at least one electronic element is inserted into the space; and
- a sealing member disposed on the at least one terminal, the sealing member includes another opening over the electric connection part to permit the elastic deformation of the electric connection part, wherein the housing further includes an elastic form to which the at least one terminal is attached, and the at least one terminal and the elastic form are formed by Laser Direct Structuring.

19. An electronic device comprising:
- a housing having an outer surface, an opening formed on the outer surface, and a space fluidly communicating with the opening;
- at least one electronic element adapted to be inserted into the space;
- at least one terminal disposed on the outer surface of the housing, the at least one terminal includes an installation part in communication with the space;
- an electric connection part disposed in the installation part for connecting the at least one electronic element with the electronic device, the electric connection part adapted to elastically deform when the at least one electronic element is inserted into the space; and
- a sealing member disposed on the at least one terminal, the sealing member includes another opening over the electric connection part to permit the elastic deformation of the electric connection part, wherein the housing comprises a first housing and a second housing, the second housing is connected to the first housing and comprises at least part of the space, and the second housing is formed by one of a dual injection molding process and an insert injection molding process.

* * * * *